United States Patent
Yoo et al.

(10) Patent No.: US 9,984,497 B2
(45) Date of Patent: May 29, 2018

(54) METHOD AND APPARATUS FOR PERFORMING TILE-BASED PATH RENDERING

(71) Applicant: Samsung Electronics Co., Ltd., Suwon-si (KR)

(72) Inventors: Jeongjoon Yoo, Hwaseong-si (KR); Sundeep Krishnadasan, Bengaluru (IN); Soojung Ryu, Hwaseong-si (KR); Seokyoon Jung, Seoul (KR); John Brothers, Calistoga, CA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 109 days.

(21) Appl. No.: 14/823,554

(22) Filed: Aug. 11, 2015

(65) Prior Publication Data

US 2016/0042561 A1 Feb. 11, 2016

(30) Foreign Application Priority Data

Aug. 11, 2014 (KR) .................. 10-2014-0103626
Jul. 13, 2015 (KR) .................. 10-2015-0099232

(51) Int. Cl.
*G06T 15/80* (2011.01)
*G06T 11/20* (2006.01)
*G06T 11/40* (2006.01)

(52) U.S. Cl.
CPC ............ *G06T 15/80* (2013.01); *G06T 11/203* (2013.01); *G06T 11/40* (2013.01)

(58) Field of Classification Search
None
See application file for complete search history.

(56) References Cited

U.S. PATENT DOCUMENTS

| | | |
|---|---|---|
| 6,828,985 B1 | 12/2004 | Long et al. |
| 6,975,318 B2 | 12/2005 | Junkins et al. |
| 7,167,171 B2 | 1/2007 | Heim et al. |
| 7,408,553 B1 | 8/2008 | Toksvig et al. |

(Continued)

FOREIGN PATENT DOCUMENTS

| | | |
|---|---|---|
| EP | 1 881 456 A1 | 1/2008 |
| GB | 2469525 A | 10/2010 |

(Continued)

OTHER PUBLICATIONS

Kilgard et al. "GPU-Accelerated Path Rendering." *ACM Transactions on Graphics* (*TOG*) vol. 31, No. 6, Article 172, Nov. 2012 (10 pages in English).

(Continued)

*Primary Examiner* — Said Broome
(74) *Attorney, Agent, or Firm* — Harness, Dickey & Pierce, P.L.C.

(57) ABSTRACT

A method of rendering at least one of paths forming an object includes setting an initial value to each of tiles included in a frame based on a position and a proceeding direction of the at least one of paths, calculating a winding number of each of the tiles through which the at least one of paths passes, among the tiles included in the frame, based on the set initial value, and determining whether to perform shading based on the set initial value and the calculated winding number.

35 Claims, 31 Drawing Sheets

(56) References Cited

U.S. PATENT DOCUMENTS

| | | | |
|---|---|---|---|
| 8,040,357 B1 * | 10/2011 | Hutchins | G06T 11/40 345/606 |
| 8,072,452 B1 * | 12/2011 | Brown | G06T 17/20 345/419 |
| 8,643,644 B2 | 2/2014 | Wei et al. | |
| 2009/0046098 A1 | 2/2009 | Barone et al. | |
| 2011/0285711 A1 | 11/2011 | Kilgard | |
| 2011/0285736 A1 * | 11/2011 | Kilgard | G06T 11/203 345/584 |
| 2011/0285741 A1 | 11/2011 | Kilgard | |
| 2012/0062585 A1 | 3/2012 | Torii et al. | |

FOREIGN PATENT DOCUMENTS

| | | |
|---|---|---|
| JP | 4366387 B2 | 11/2009 |
| KR | 10-0762811 B1 | 10/2007 |
| KR | 10-2011-0042872 A | 4/2011 |
| KR | 10-2013-0051275 A | 5/2013 |
| WO | WO 2010/134124 A1 | 11/2010 |

OTHER PUBLICATIONS

Yoo et al. "Tile Boundary Sharing for Tile-Based Vector Graphics Rendering." *IEEE International Conference on Consumer Electronics (ICCE)*, 2014, pp. 93-94.

Extended European Search Report dated Feb. 1, 2016 in counterpart European Application No. 15180225.3 (10 pages in English).

* cited by examiner

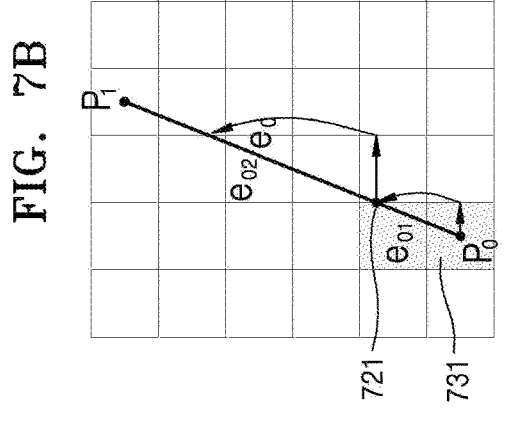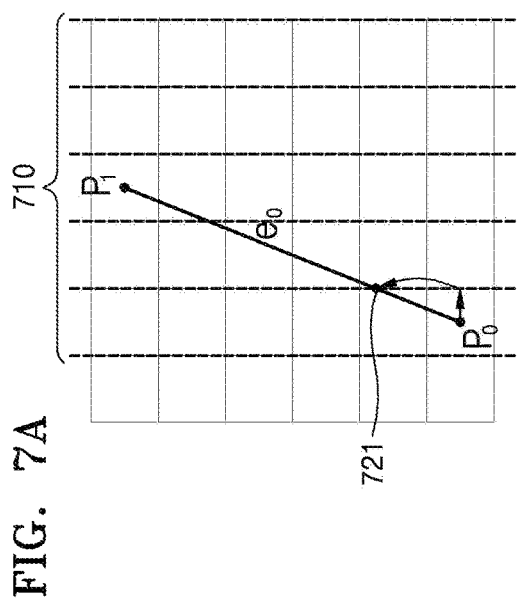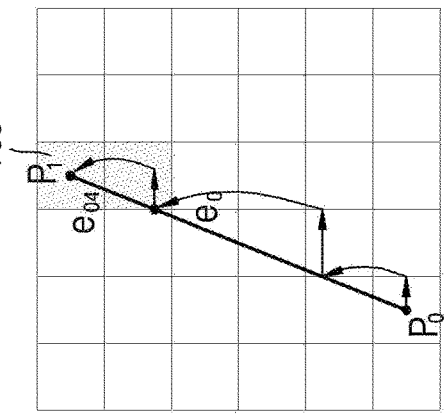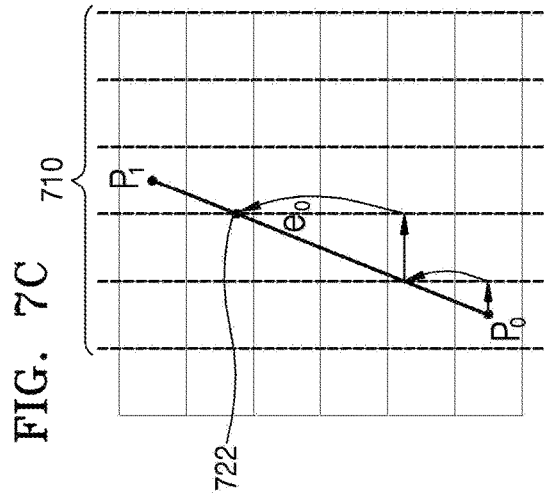

Non-monotonic
curve

Monotonic
curves

Cubic curve

METHOD AND APPARATUS FOR PERFORMING TILE-BASED PATH RENDERING

CROSS-REFERENCE TO RELATED APPLICATION(S)

This application claims the benefit of Korean Patent Applications Nos. 10-2014-0103626 filed on Aug. 11, 2014, and 10-2015-0099232 filed on Jul. 13, 2015, in the Korean Intellectual Property Office, the entire disclosures of which are incorporated herein in by reference for all purposes.

BACKGROUND

1. Field

The present disclosure relates to a method and apparatus for performing tile-based path rendering.

2. Description of Related Art

Studies have recently been conducted on methods of improving the acceleration performance of a graphics processing unit (GPU) when vector graphics or path rendering is performed. The hardware structure of a GPU is designed on the assumption that all pieces of input data are configured as a triangle in order to accelerate three-dimensional graphics. However, for path rendering, input data is configured not as triangles but as a combination of a command and a vertex. Accordingly, it is difficult to improve the acceleration performance of a GPU when performing path rendering.

For example, in order to draw a curve by using a GPU, a control processing unit (CPU) primarily divides the curve into a plurality of triangles by using a start point of the curve as a center and instructs the GPU to reconfigure the divided triangles as a curved line. Accordingly, a lot of time is consumed by a CPU when dividing the curve into a plurality of triangles. Also, the CPU communicates with the GPU whenever calling multiple OpenGL APIs and a lot of changes occur in the state of the GPU.

In this connection, a stencil-based path rendering method using a stencil buffer in the GPU has been suggested. However, according to the stencil-based path rendering method, data input to/output from memory is excessively generated during rendering and thus the stencil buffer is incapable of parallel processing. Thus, the improvement in the acceleration performance of the GPU is limited.

SUMMARY

Provided is a method and apparatus for performing path rendering. Also, provided is a non-transitory computer readable storage medium having stored thereon a program, which when executed by a computer, performs the above method.

Additional aspects will be set forth in part in the description which follows and, in part, will be apparent from the description, or may be learned by practice of the presented embodiments.

According to an aspect of the present inventive concept, a method of rendering an object including a path includes obtaining path data including information about vertices included in the path and a command corresponding to the path, calculating a winding number of each of tiles included in a frame based on the path data, and determining whether to perform shading based on the winding number of the tile.

According to another aspect of the present inventive concept, a method of calculating a winding number of a pixel includes receiving, from a graphics processing unit, information about at least one path and information about a first winding number set to each of tiles included in a frame, calculating a winding number corresponding to each of the pixels included in the frame based on the received information, and outputting the calculated winding number to the graphics processing unit.

According to another aspect of the present inventive concept, a method of rendering an object includes dividing an image comprising a path into a plurality of tiles, each of the tiles comprising a plurality of pixels, and assigning, via different methods, a winding number to pixels included in tiles where no path exists and pixels included in tiles where a path exist, from among the plurality of tiles.

According to another aspect of the present inventive concept, there is provided a non-transitory computer readable storage medium having stored thereon a program, which when executed by a computer, performs the above method.

According to another aspect of the present inventive concept, an apparatus for rendering an object including a path includes an operation unit configured to obtain path data including information about vertices included in the path and a command corresponding to the path, and a determination unit configured to determine whether to perform shading based on a winding number of a tile.

According to another aspect of the present inventive concept, an apparatus for generating a winding number of each of pixels included in a frame, the apparatus being connected to a graphics processing unit configured to render at least one path forming an object and being configured to receive, from the graphics processing unit, information about the at least one path and information about a first winding number set to each of tiles included in the frame, calculate a winding number corresponding to each of the pixels included in the frame based on the received information, and output the calculated winding number to the graphics processing unit.

BRIEF DESCRIPTION OF THE DRAWINGS

These and/or other aspects will become apparent and more readily appreciated from the following description of the embodiments, taken in conjunction with the accompanying drawings in which:

FIGS. 7A to 7E illustrate an example in which the operation unit selects tiles, through which a path passes, from among tiles included in a frame, according to an embodiment;

DETAILED DESCRIPTION

Reference will now be made in detail to embodiments, examples of which are illustrated in the accompanying drawings.

Figure 1:
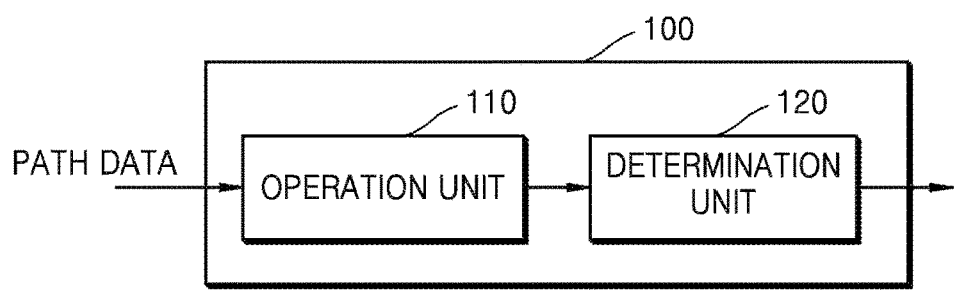
FIG. 1 is a block diagram illustrating an example of a rendering apparatus according to an embodiment.

FIG. 1 is a block diagram illustrating an example of a rendering apparatus 100 according to an embodiment.

Referring to FIG. 1, the rendering apparatus 100 may include an operation unit 110 and a determination unit 120. In FIG. 1, only constituent elements related to the rendering apparatus 100 for performing path rendering according to the present embodiment are illustrated. Accordingly, other general constituent elements may be included in the rendering apparatus 100 for performing path rendering in addition to the constituent elements illustrated in FIG. 1.

Also, the operation unit 110 and the determination unit 120 of the rendering apparatus 100 illustrated in FIG. 1 may correspond to one or a plurality of processors. A processor may be embodied by an array of a plurality of logic gates or by a combination of a general microprocessor and a memory storing a program that may be executed by the microprocessor. Also, it will be understood by those of ordinary skill in the art that the processor may be embodied in a different form of hardware.

The operation unit 110 obtains path data including information about vertices included in a path and a command corresponding to the path. The operation unit 110 determines a winding number of each of tiles included in a frame based on the path data.

For example, the operation unit 110 may receive path data from an external apparatus of the rendering apparatus 100 and set a first winding number to each of the tiles based on information about the position and proceeding direction of a path included in the path data. The external apparatus may be a memory or a central processing unit (CPU) outside the rendering apparatus 100. The operation unit 110 may determines a second winding number of each of tiles through which the path passes from among the tiles included in a frame based on the first winding number.

The determination unit 120 determines whether to perform shading based on the winding number of a tile.

The rendering apparatus 100 determines a winding number in units of tiles and determines whether to perform shading based on the determined winding number. In detail, the operation unit 110 determines the first winding number to be a winding number for the tiles through which the path does not pass among the tiles included in a frame and the second winding number to be a winding number for the tiles through which the path passes. Accordingly, as the winding number is precisely calculated only for the tiles through which the path passes from among the tiles included in a frame, the performance of the rendering apparatus 100 may be improved.

An example of the operation of the rendering apparatus 100 is described below in detail with reference to FIG. 2.

Figure 2:
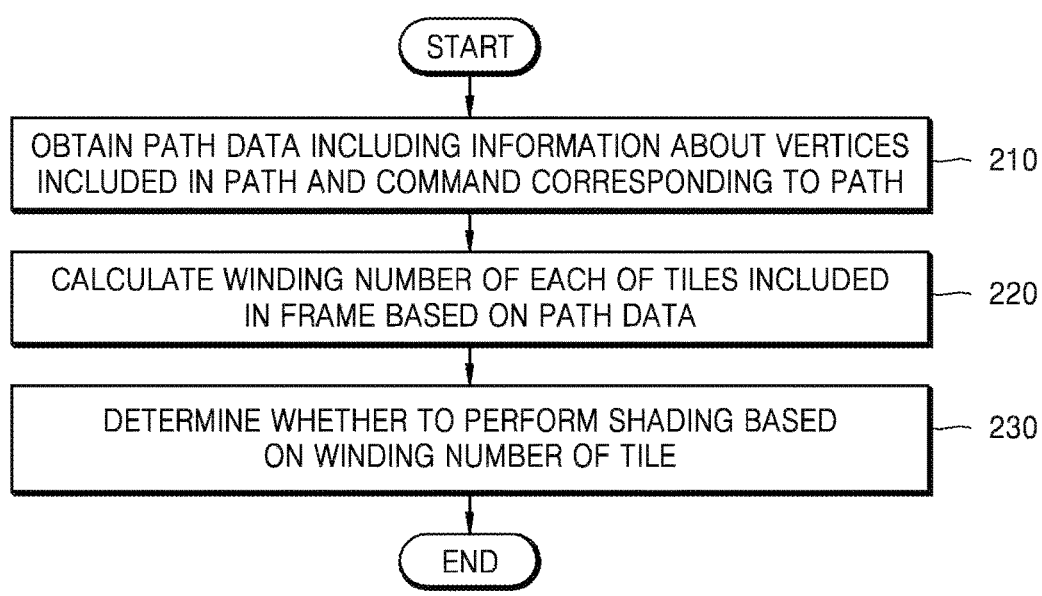
FIG. 2 is a flowchart of an example of a method of performing path rendering according to an embodiment.

FIG. 2 is a flowchart for explaining an example of a method of performing path rendering according to an embodiment.

Referring to FIG. 2, the method of performing path rendering includes operations that are time-serially processed by the rendering apparatus 100 of FIG. 1.

In an operation 210, the operation unit 110 obtains path data including information about vertices included in a path and a command corresponding to the path.

The path may be an element constituting a target, for example, an object, to be rendered by the rendering apparatus 100. For example, the path may be a straight line or a curved line connecting from one point to another point. The object may include a closed polygon or a closed path formed by connecting at least one path. The rendering apparatus 100 may perform rendering by dividing an image or a part of an image into continuous small tiles. For example, the rendering apparatus 100 may perform rendering by dividing an entire screen or a part of a screen of a frame displaying a moving image or a still image into continuous small tiles. For example, one tile may include pixels of 32×32, but the present embodiment is not limited thereto.

The path data includes information about coordinates of each of a plurality of vertexes included in a path and commands for forming a path by combining the vertexes. The vertexes include a vertex corresponding to a start position of a path and a vertex corresponding to an end position of the path.

For example, assuming that a straight line from a first pixel to a second pixel among the pixels included in a frame (not shown) is defined to be a path, the vertexes signify points corresponding to the first and second pixels. Accordingly, the path data includes coordinates of a first vertex corresponding to the first pixel, coordinates of a second vertex corresponding to the second pixel, and a command for forming a straight line from the first vertex to the second vertex. Accordingly, in addition to the information about the coordinates of each of the vertexes forming the path, information about the position and proceeding direction of the path may also be obtained by referring to the path data. Also, the path data may include information about a color value set to each pixel.

In an operation 220, the operation unit 110 determines a winding number of each of the tiles included in a frame based on the path data.

The operation unit 110 sets the first winding number with respect to each of the tiles based on information about the position and proceeding direction of a path included in the path data. The operation unit 110 determines a second winding number of each of tiles through which the path passes among the tiles included in a frame based on the first winding number.

The winding number of a tile is a winding number of each of pixels included in the tile. All pixels of a tile may have the same winding number or different winding numbers according to the passing of a path through the tile.

The winding number may be a predetermined value indicating the number of rotations made during rendering of a path, with respect to one side of a particular pixel.

The winding number may be determined by increasing the predetermined value when the path forms a complete circle clockwise and decreasing the predetermined value when the path forms a complete circle counterclockwise. In another embodiment the winding number may be determined in the opposite way to the above, i.e., by decreasing the predetermined value when the path forms a complete circle clockwise and increasing the predetermined value when the path forms a complete circle counterclockwise. Still, in another embodiment, the winding number may be determined by decreasing the predetermined value when the path forms a complete circle clockwise and increasing the predetermined value when the path forms a complete circle counterclockwise.

In an example, when a path forms a complete circle clockwise, the winding number of a pixel may be +1. Also, when the path forms a complete circle counterclockwise, the winding number of a pixel may be −1.

In another example, when a path forms a complete circle clockwise, the winding number of a pixel may be −1. Also, when the path forms a complete circle counterclockwise, the winding number of a pixel may be +1.

Also, the predetermined value may be an integer, but the present embodiment is not limited thereto. In other words, when one side is viewed from a position of a particular pixel, the winding number may correspond, without limitation, to any number that is mapped to the number of rotations rendered during rendering of a path.

In the following description for convenience of explanation, it is assumed that the winding number is +1 when a path forms a complete circle clockwise and the winding number is −1 when the path forms a complete circle counterclockwise. The winding number is described in detail with reference to FIG. 3.

Figure 3:
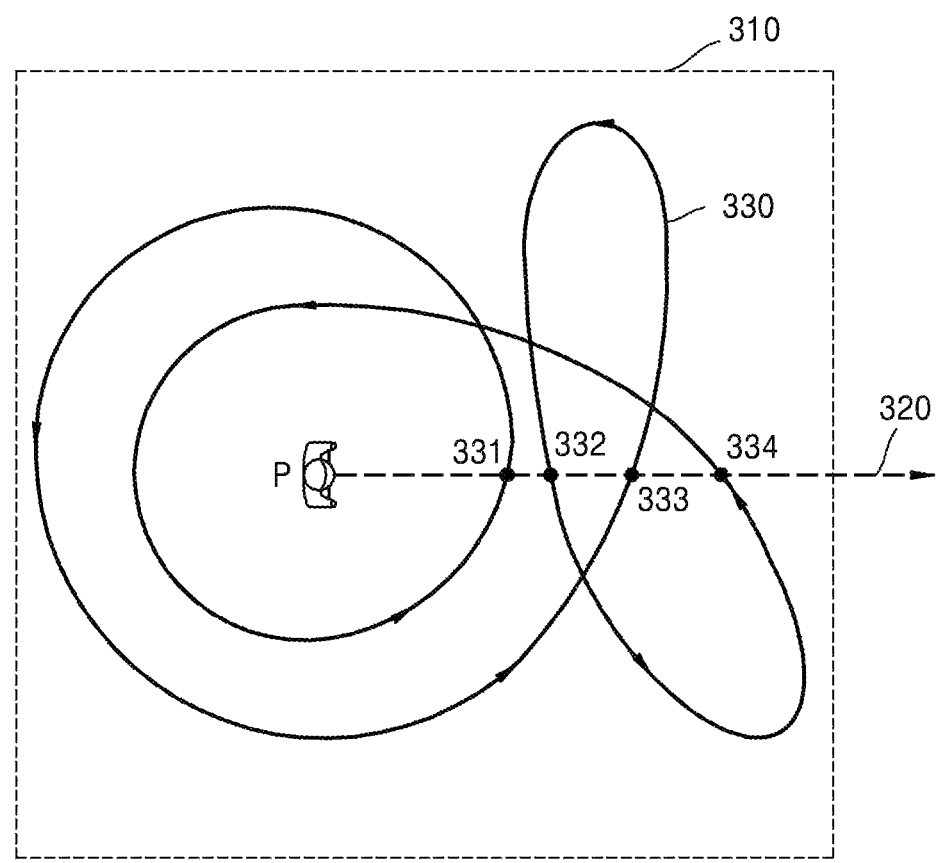
FIG. 3 illustrates a winding number according to an embodiment.

FIG. 3 is a view for explaining a winding number according to an embodiment.

FIG. 3 illustrates an example for explaining a winding number corresponding to a pixel P of pixels included in a frame 510. In FIG. 3, for convenience of explanation, the pixel P is illustrated as a shape of a person. FIG. 3 illustrates, for convenience of explanation, a shape of a person who sees the pixel P in one direction.

Referring to FIG. 3, a path 330 is illustrated around the pixel P and the path 330 is illustrated to be a closed path.

When the imaginary half line 320 is rendered in the horizontal direction, starting from the pixel P and toward the right side thereof, the imaginary half line 320 and the path 330 intersect at a total of four vertexes 331, 332, 333, and 334. Accordingly, the winding number of the pixel P may be determined based on the direction in which the path 330 is rendered at each of the four vertexes 331, 332, 333, and 334.

In detail, the direction in which the path 330 is rendered at the first vertex 331 is a counterclockwise direction, that is, from bottom to top. Accordingly, the winding number of the pixel P is primarily calculated to be −1. The direction in which the path 330 is rendered at the second vertex 332 is a clockwise direction, that is, from top to bottom, and thus the winding number of the pixel P is secondarily calculated to be 0 (−1+1). The direction in which the path 330 is rendered at the third vertex 333 is the counterclockwise direction and thus the winding number of the pixel P is thirdly calculated to be −1 (−1+1−1). The direction in which the path 330 is rendered at the fourth vertex 334 is the counterclockwise direction and thus the winding number of the pixel P is finally calculated to be −2 (−1+1−1−1).

According to the above description with reference to FIG. 3, although the winding number of the pixel P is described to be calculated considering the path located at the right side of the pixel P, the present embodiment is not limited thereto. In other words, the operation unit 110 may calculate the winding number of the pixel P considering the path located at at least one of the left, right, upper, and lower sides with respect to the position of the pixel P.

The operation unit 110 calculates the winding number of each pixel included in the tile without using the stencil buffer. In other words, the operation unit 110 may calculate in parallel the winding number of each of the tiles without rendering triangles including the object in the stencil buffer. Accordingly, an increase in the number of the data input/output and an increase in the rendering time occurring in the rendering based on the stencil buffer may be prevented.

Also, the operation unit 110 may calculate the winding number by using a plurality of threads. A single thread may be used in calculating the winding number of a single pixel. Since the threads may be parallel processed, the operation unit 110 may simultaneously operate the winding numbers of the pixels by using the threads. Accordingly, the rendering apparatus 100 may perform path rendering at high speed.

Referring back to FIG. 2, the operation unit 110 calculates a winding number in detail only for the tiles through which a path passes. In other words, the operation unit 110 sets a first winding number with respect to all tiles included in the frame and calculates a second winding number based on the first winding number only with respect to the tiles through which a path passes from among the tiles included in the frame. Since the winding number of pixels included in the tiles through which a path does not pass is determined as the first winding number, all pixels included in the tiles through which a path does not pass have the same winding number. Accordingly, the rendering apparatus 100 may perform path rendering at high speed.

An example in which the operation unit 110 calculates the second winding number only for the tiles through which a path passes is described below with reference to FIG. 4.

Figure 4:
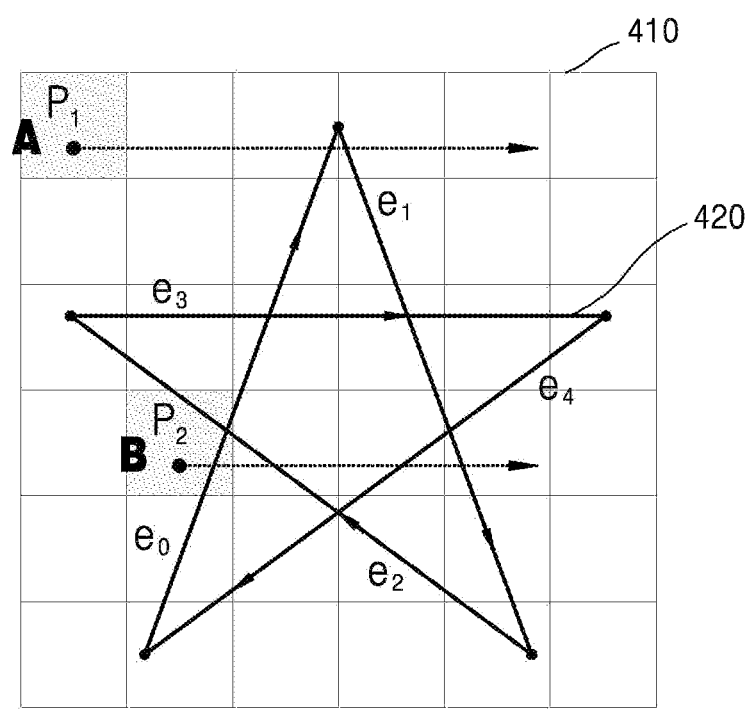
FIG. 4 illustrates an example in which an operation unit calculates a winding number of a tile, according to an embodiment.

FIG. 4 illustrates an example in which the operation unit 110 calculates a winding number of a tile according to an embodiment.

FIG. 4 illustrates a frame 510 formed of a plurality of tiles and a plurality of paths $e_0$, $e_1$, $e_2$, $e_3$, and $e_4$ forming an object 520 having a star shape. Referring to FIG. 4, the paths $e_0$, $e_1$, $e_2$, $e_3$, and $e_4$ forming the object 520 do not pass through a tile A. However, the paths $e_0$ and $e_2$ of the paths $e_0$, $e_1$, $e_2$, $e_3$, and $e_4$ forming the object 520 pass through a tile B.

In a general calculation of a winding number, a winding number of each pixel included in the frame 510 is calculated. For example, the winding number of a pixel $P_1$ may be calculated considering the positions and proceeding directions of all paths $e_0$ and $e_1$ existing in one side of the pixel $P_1$. Also, the winding number of a pixel $P_2$ included may be calculated considering the positions and proceeding directions of all paths $e_0$, $e_2$, $e_4$, and $e_1$ existing in one side of the pixel $P_2$.

Assuming that the winding number is calculated based on the paths located at the right side of the pixels $P_1$ and $P_2$, although no path passes through the tile A, the winding number of the pixel $P_1$ is calculated based on the paths $e_0$ and $e_1$ that do not pass through the tile A. Also, the winding number of the pixel $P_2$ is calculated considering not only the paths $e_0$ and $e_2$ that pass through the tile B but also the paths $e_4$ and $e_1$ that do not pass through the tile B. Accordingly, in a general rendering apparatus, a large amount of calculations is performed to calculate the winding numbers of the pixels $P_1$ and $P_2$ because even the paths that do not pass through the tiles A and B are taken into consideration.

However, the rendering apparatus 100 may calculate the winding number of a pixel without considering a path that does not pass through a tile. In detail, the operation unit 110 sets a first winding number to each of the tiles included in the frame 510 based on the position and proceeding direction of a path, and the operation unit 110 calculates a second winding number only of each of tiles through which a path passes from among the tile included in the frame 510. Accordingly, the rendering apparatus 100 may determine the winding numbers of all pixels without independently calculating the winding numbers of pixels for a tile through which a path does not pass. Accordingly, the rendering apparatus 100 may perform path rendering at high speed.

Referring back to FIG. 2, in an operation 230, the determination unit 120 may determine whether to perform shading based on the winding number of a tile. The shading may be performed by a fragment shader 2731. Accordingly, t the determination unit 120 may determine whether to instruct the fragment shader 2731 to perform shading of a pixel. The shading may be a process of setting a color to each of pixels, but the present embodiment is not limited thereto. For example, the shading may be a process of setting brightness to each pixel or expressing texture of each pixel. Also, the fragment shader 2731 may perform shading of a pixel based on the texture.

For example, the determination unit 120 may determine whether to perform shading based on the first winding number set by the operation unit 110, with respect to the pixels included in a tile through which a path does not pass. Also, for the pixels included in a tile through which a path passes the determination unit 120 may determines whether to perform shading based on the second winding number calculated by the operation unit 110. In doing so, the determination unit 120 may determine whether to perform shading based on a preset rule.

Hereinafter, an example in which the operation unit 110 sets a first winding number to each of the tiles is described below with reference to FIGS. 5 to 15.

Figure 5:
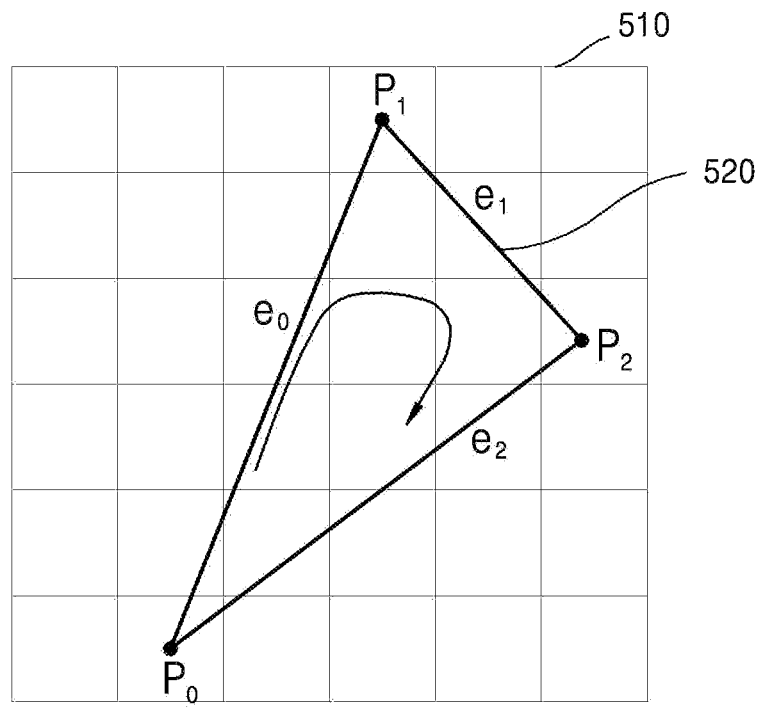
FIG. 5 illustrates an example of paths used by the operation unit to set a first winding number, according to an embodiment.

FIG. 5 illustrates an example of paths used by the operation unit 110 to set a first winding number according to an embodiment.

Referring to FIG. 5, a frame 510 includes tiles of 6×6 and an object 520 having a triangular shape includes three paths $e_0$, $e_1$, and $e_2$. The path $e_0$ is a straight path from Vertex $P_0$ to Vertex $P_1$. The path $e_1$ is a straight path from Vertex $P_1$ to Vertex $P_2$. The path $e_2$ is a straight path from Vertex $P_2$ to Vertex $P_0$.

It is assumed that the operation of the operation unit 110 that will be described with reference to FIGS. 6 to 13 is performed based on the paths $e_0$, $e_1$, and $e_2$ of FIG. 5. In other words, it is assumed that the path data received by the operation unit 110 includes information about the position and proceeding direction of each of the paths $e_0$, $e_1$, and $e_2$.

In detail, it is assumed that the path data includes information about the coordinates of each of the vertexes $P_0$, $P_1$, and $P_2$, and the commands for forming the paths $e_0$, $e_1$, and $e_2$ by combining the vertexes, for example, a command to render a straight path from Vertex $P_0$ to Vertex $P_1$, a command to render a straight path from Vertex $P_1$ to Vertex $P_2$, and a command to render a straight path from Vertex $P_2$ to Vertex $P_0$.

The operation unit 110 sets a first winding number to each of the tiles included in the frame. In detail, the operation unit 110 assigns an initial winding number to each of the tiles included in the frame. For example, the initial winding number is 0. In other words, 0 may be assigned as a default value to each of the files included in the frame.

The operation unit 110 selects the tiles through which at least one of paths passes from among the tiles included in the frame. The operation unit 110 updates the initial winding number of each of the tiles located at one side of the selected tiles according to the shape of the path passing in each of the selected tiles. The one side of a tile denotes any one of the left, right, upper, and lower sides of a tile. In detail, an example in which the operation unit 110 selects the tiles through which at least one of paths passes from among the tiles included in the frame and updates an initial winding number of each of the tiles located at one side of the selected tiles is described below in detail.

First, the operation unit 110 receives path data from an external apparatus. The path data includes information about a total of the three paths $e_0$, $e_1$, and $e_2$ of the object illustrated in FIG. 5. The operation unit 110 assigns the value 0 as an initial winding number to all tiles included in the frame and updates the assigned value for all of the tiles by sequentially considering a plurality of paths $e_0$, $e_1$, and $e_2$, thereby setting the first winding number.

In detail, the operation unit 110 obtains a first initial value $WN_{init\_1}$ by adding or subtracting a predetermined value to or from the initial winding number, for example, 0, assigned to the tile based on the position and proceeding direction of the first path $e_0$. In doing so, the initial winding numbers of some of the tiles included in the frame may be determined to be the first initial value $WN_{init\_0}$ without a change.

Then, the operation unit 110 obtains a second initial value $WN_{init\_2}$ by adding or subtracting a predetermined value to or from the first initial value $WN_{init\_1}$ based on the position and proceeding direction of the second path $e_1$. In doing so, the first initial values $WN_{init\_1}$ of some of the tiles included in the frame may be determined to be the second initial value $WN_{init\_2}$ without a change.

Then, the operation unit 110 obtains a third initial value $WN_{init\_3}$ by adding or subtracting a predetermined value to or from the second initial value $WN_{init\_2}$ based on the position and proceeding direction of the third path $e_2$. In doing so, the second initial values $WN_{init\_2}$ of some of the tiles included in the frame may be determined to be the third initial value $WN_{init\_3}$ without a change.

Finally, the operation unit 110 determines the third initial value $WN_{init\_3}$ to be the first winding number $WN_{init}$.

In the following descriptions, an example in which the operation unit 110 obtains the first initial value $WN_{init\_1}$ based on the position and proceeding direction of the first path $e_0$ is described with reference to FIGS. 6A to 9C, and an example in which the operation unit 110 obtains the second initial value $WN_{init\_2}$ based on the position and proceeding direction of the second path $e_1$ is described with reference to FIGS. 10A to 11C. Also, an example in which the operation unit 110 obtains the third initial value $WN_{init\_3}$ based on the position and proceeding direction of the third path $e_2$ is described with reference to FIGS. 12 and 13B, and finally an example of determining the third initial value $WN_{init\_3}$ to be the first winding number $WN_{init}$ is described.

Figure 6B:
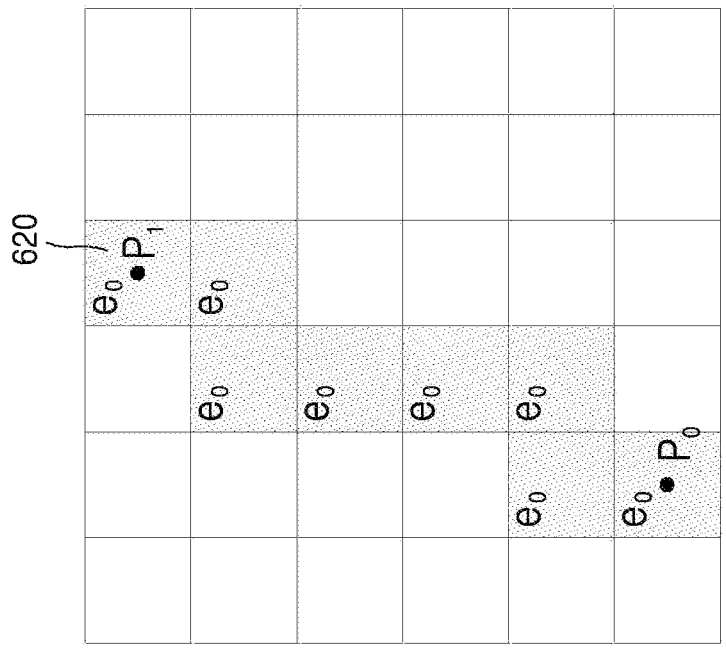
FIGS. 6A and 6B are views for explaining an example in which the operation unit selects tiles, through which a first path passes, from tiles included in a frame, according to an embodiment.
Figure 6A:
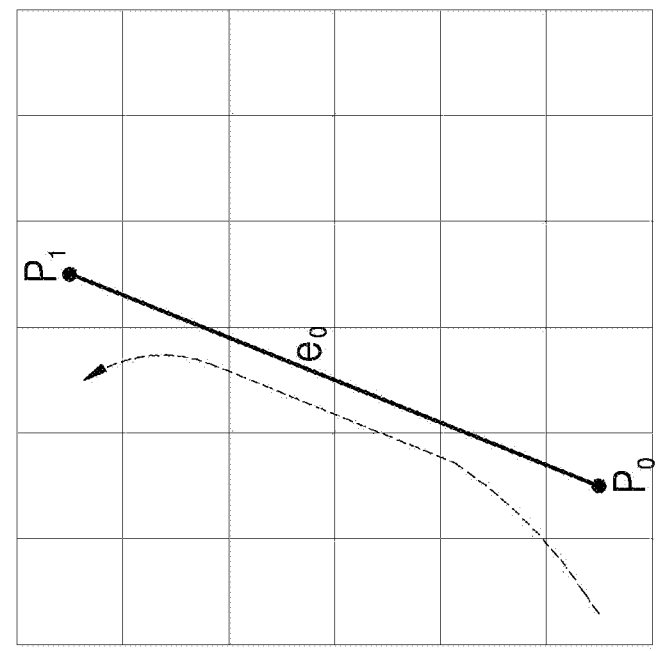

FIGS. 6A and 6B illustrate an example in which the operation unit 110 selects a tile through which the first path $e_0$ passes from among the tiles included in a frame according to the present embodiment.

FIG. 6A illustrates the first path $e_0$. The first path $e_0$ is a straight path connected from Vertex $P_0$ to Vertex $P_1$. Assuming that the first path $e_0$ is viewed from the left side thereof, it may be seen that the first path $e_0$ is a path that rotates counterclockwise.

FIG. 6B illustrates tiles 620, through which the first path $e_0$ passes, among the tiles included in a frame. The operation unit 110 selects the tiles 620, through which the first path $e_0$ passes, among the tiles included in the frame. The operation unit 110 generates information "Edge_List" indicating that the first path $e_0$ passes through the tile, for each of the selected tiles of the tiles 620, and stores the information in a local memory 150 of FIG. 25. For example, the information Edge_List may be stored in the form of a bitstream in the local memory 150 according to each tile. "$e_0$" indicated in each of the tiles 620 of FIG. 6B denotes information included in the information Edge_List of each of the tiles 620, in other words, information that the first path $e_0$ passes through the tile.

An example in which the operation unit 110 selects the tiles 620 through which the first path $e_0$ passes from among the tiles included in the frame is described below with reference to FIGS. 7A to 7E.

FIGS. 7A to 7E illustrate an example in which the operation unit 110 according to the present embodiment selects the tiles through which a path passes from among the tiles included in a frame.

The operation unit 110 determines a point where a path and an outline of one side of each of the tiles included in the frame meet. The outline of one side of each of the tiles may be an outline of any one of the left, right, upper and lower sides of each of the tiles. Referring to FIG. 7A, the first path $e_0$ is connected from Vertex $P_0$ to Vertex $P_1$ and the operation unit 110 determines a point 721 where the first path $e_0$ meets a right outline 710 of each of the tiles.

The operation unit 110 virtually divides a path with respect to the point 721 that is determined. The virtual dividing of a path by the operation unit 110 does not mean actual dividing of a path but may mean a process of calculating intermediate points on the path for the operation unit 110 to accurately select the tiles through which the path passes from among the tiles included in the frame.

Referring to FIG. 7B, the operation unit 110 virtually divides the first path $e_0$ into a first sub-path $e_{01}$ from Vertex $P_1$ where the first path $e_0$ starts to the point 721 that is determined and a second sub-path $e_{02}$ from the point 721 that is determined to Vertex $P_1$ where the first path $e_0$ ends.

The operation unit 110 forms a rectangle having a divided path as a diagonal line. The operation unit 110 selects tiles including the rectangle that is formed. Referring to FIG. 7B, the operation unit 110 forms a rectangle having the first sub-path $e_{01}$ as a diagonal line. The operation unit 110 selects tiles 731 including the formed rectangle.

If the path $e_0$ and one side of the tiles included in the frame meet at a plurality of points, the operation unit 110 repeatedly performs the above process described with reference to FIGS. 7A and 7B. Referring to FIG. 7C, the operation unit 110 determines a point 722 where the first path $e_0$ meets the right outline 710.

The operation unit 10A to 11C virtually divides the path with respect to the point 722 that is determined. Referring to FIG. 7D, the operation unit 10A to 11C divides the second sub-path $e_{02}$ into a third sub-path $e_{03}$ from the point 721 to the point 722 that is determined and a fourth sub-path $e_{04}$ from the point 722 that is determined to Vertex $P_1$ where the second sub-path $e_{02}$ ends.

The operation unit 10A to 11C forms a rectangle having a divided path as a diagonal line. The operation unit 10A to 11C selects tiles including the rectangle that is formed. Referring to FIG. 7D, the operation unit 10A to 11C forms a rectangle having the third sub-path $e_{03}$ as a diagonal line. The operation unit 10A to 11C selects tiles 732 including the rectangle that is formed.

When there is no further point where the one side of the tiles included in the frame and the path meet, the operation unit 10A to 11C forms a rectangle having the remaining sub-path divided from the first path $e_0$ as a diagonal line and selects tiles included in the rectangle. Referring to FIG. 7E, the operation unit 10A to 11C forms a rectangle having the fourth sub-path $e_{04}$ as a diagonal line. The operation unit 10A to 11C selects tiles 733 including the formed rectangle.

Finally, the operation unit 10A to 11C may determine the tiles 731, 732, and 733, through which the first path $e_0$ passes, among the tiles included in the frame, by combining the selected tiles 731, 732, and 733.

As described above with reference to FIGS. 7A to 7E, the operation unit 10A to 11C may accurately select the tiles 731, 732, and 733 through which the first path $e_0$ passes from among the tiles included in the frame by dividing the path into at least one of sub-paths and selecting the tiles including a rectangle having the sub-path as a diagonal line.

When the tiles 731, 732, and 733, through which the first path $e_0$ passes are selected, the operation unit 10A to 11C obtains the first initial value $WN_{init\_1}$ by updating the initial winding number of each of the tiles located at one side of each of the tiles 731, 732, and 733 that are selected, according to a shape of the first path $e_0$ passing through each of the tiles 731, 732, and 733 that are selected. The one side signifies any one of the left, right, upper, and lower sides of a tile. An example in which the operation unit 10A to 11C obtains the first initial value $WN_{init\_1}$ of each of the tiles is described below with reference to FIGS. 8 to 9C.

Figure 8:
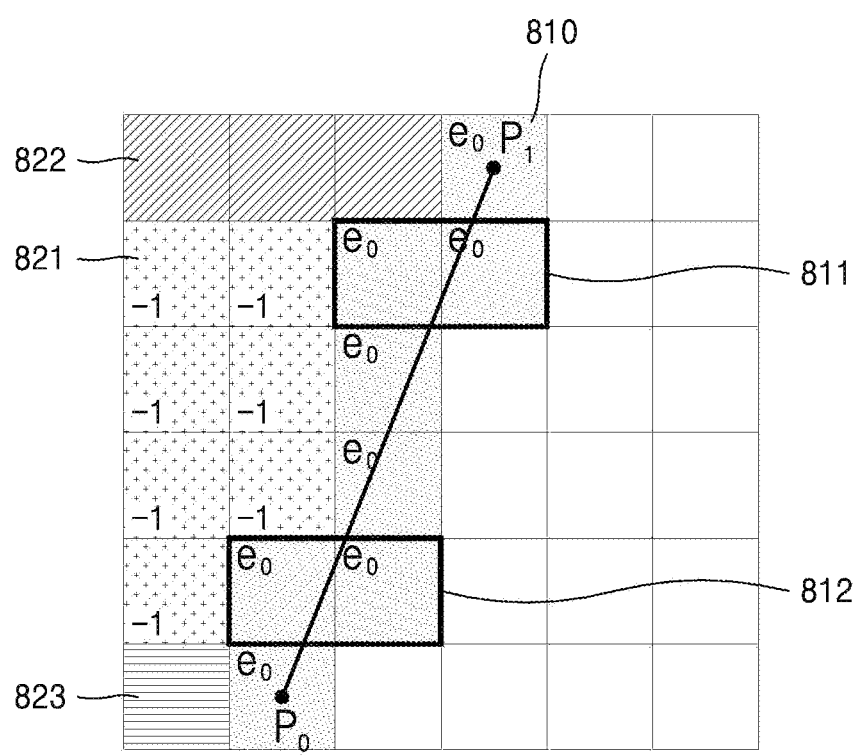
FIG. 8 is a view for explaining an example in which the operation unit obtains a first initial value of each of tiles, according to an embodiment.

FIG. 8 illustrates an example in which the operation unit 10A to 11C obtains the first initial value of each of predetermined tiles according to the present embodiment.

For convenience of explanation, FIG. 8 illustrates tiles located on one side of selected tiles 810 to be tiles 921, 822, and 823 located at the left side of the selected tiles 810. However, the present embodiment is not limited thereto. In other words, the first initial value $WN_{init\_1}$ of the tiles located at any one of the right, upper, and lower sides of the tiles 710 through which the first path $e_0$ passes may be obtained. The selected tiles 810 are the tiles 731, 732, and 733, through which the first path $e_0$ passes, as described above with reference to FIGS. 7A to 7E.

Also, although it is not illustrated in FIG. 8, the initial winding number is assigned to all tiles included in a frame. For example, 0 may be assigned as a default value to all tiles included in a frame.

Referring to FIG. 8, the operation unit 10A to 11C obtains the first initial value $WN_{init\_1}$ for the tiles 921 from among the tiles 921, 822, and 823 located at the left side of the selected tiles 810. In other words, the operation unit 10A to 11C delays calculation of the first initial value $WN_{init\_1}$ with respect to the tile 923 located at the left side of the tile including Vertex $P_0$ where the first path $e_0$ starts and the tiles 922 located at the left side of the tile including Vertex $P_1$ where the first path $e_0$ ends.

As described above with reference to FIG. 5, Vertex $P_0$ is a point where the first path $e_0$ and the third path $e_2$ meet, and Vertex $P_1$ is a point where the first path $e_0$ and the second path $e_1$ meet. In other words, the operation unit 10A to 11C delays calculation of the first initial value $WN_{init\_1}$ with respect to the tiles 922 and 923 located at the left side of the tile having Vertex $P_0$ and Vertex $P_1$ where two or more paths meet. The operation unit 10A to 11C obtains the second initial value $WN_{init\_2}$ with respect to the tiles 922 and 923, considering a shape of two or more paths passing through the tiles, which is described later with reference to FIG. 11.

The operation unit 10A to 11C may obtain the first initial value $WN_{init\_1}$ by adding or subtracting a predetermined value to or from the initial winding number assigned to the tiles 921 in accordance with a preset rule. In an example, the operation unit 10A to 11C may obtain the first initial value $WN_{init\_1}$ of the tiles 921 by adding a predetermined value to the initial winding number when the first path $e_0$ passes through two opposite boundaries of the tiles 810 clockwise and subtracting a predetermined value from the initial winding number when the first path $e_0$ passes through the two opposite boundaries of the tiles 810 counterclockwise. In another example, the operation unit 10A to 11C may obtain the first initial value $WN_{init\_1}$ of the tiles 921 by subtracting a predetermined value from the initial winding number when the first path $e_0$ passes through the two opposite boundaries of the tiles 810 clockwise and adding a predetermined value to the initial winding number when the first path $e_0$ passes counterclockwise through the two opposite boundaries of the tiles 810. The predetermined value may be 1, but the present embodiment is not limited thereto. In other words, the predetermine value may correspond, without limitation, to any value that is predetermined according to the proceeding direction of a path.

An example of a rule of obtaining the first initial value $WN_{init\_1}$ by using the operation unit 10A to 11C is described with reference to FIGS. 9A to 9C.

Figure 9A:
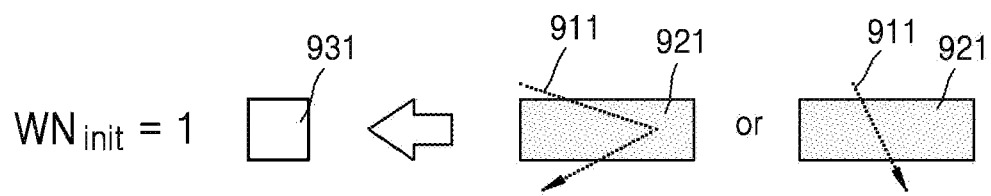
FIGS. 9A to 9C illustrate an example of a rule of assigning a first initial value with respect to one path by the operation unit, according to an embodiment.
Figure 9B:
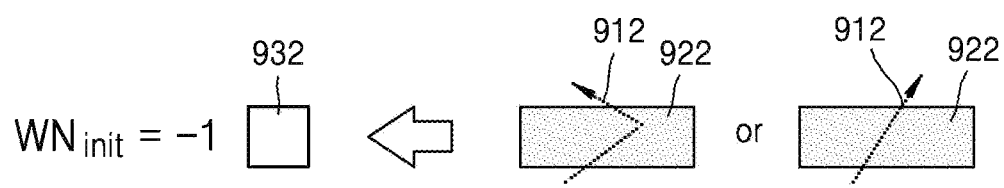
Figure 9C:
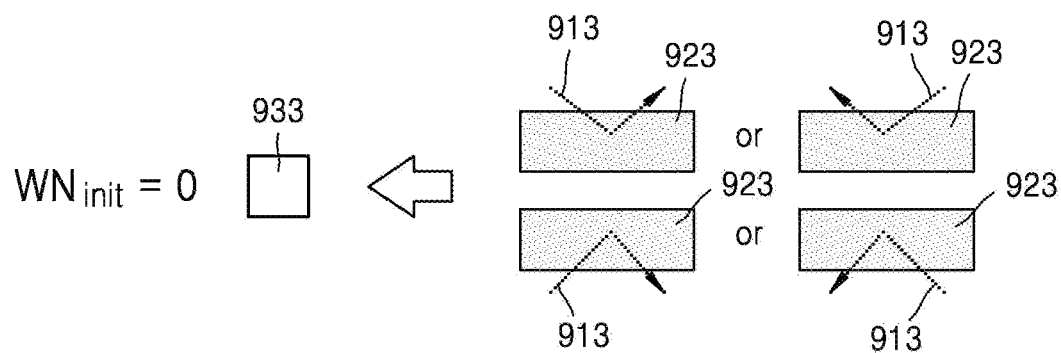

FIGS. 9A to 9C illustrate an example of a rule of assigning the first initial value $WN_{init\_1}$ by the operation unit 10A to 11C.

FIG. 9A illustrates a case in which a path 911 passes through two opposite boundaries of a tile 921 clockwise, that is, from top to bottom. FIG. 9B illustrates a case in which a path 912 passes through two opposite boundaries of a tile 922 counterclockwise, that is, from bottom to top. FIG. 9C illustrates a case in which a path 913 enters and exits through one boundary of a tile 923.

The tiles 921, 922, and 923 illustrated in FIGS. 9A to 9C may be tiles obtained by combining two or more tiles. For example, when two or more tiles through which a path passes are continuously provided in a horizontal direction, the two or more tiles may be considered as one of the tiles 921, 922, and 923 respectively illustrated in FIGS. 9A to 9C. Referring to FIG. 8, the first path $e_0$ passes through two neighboring tiles 811 and 812 in the second and fifth rows of a frame. In this case, the two neighboring tiles 811 and 812 through which the first path $e_0$ passes may be considered as one of the tiles 921, 922, and 923 respectively illustrated in FIGS. 9A to 9C.

Referring to FIG. 9A, when the path 911 passes clockwise through the two opposite boundaries of the tile 921, that is, from top to bottom, the operation unit 10A to 11C obtains the first initial value $WN_{init\_1}$ by adding 1 to the initial winding number of all tiles 931 located at the left side of the tile 921.

Referring to FIG. 9B, when the path 912 passes counterclockwise through the two opposite boundaries of the tile 922, that is, from bottom to top, the operation unit 10A to 11C obtains the first initial value $WN_{init\_1}$ by subtracting 1 from the initial winding number of all tiles 932 located at the left side of the tile 922.

Referring to FIG. 9C, when the path 913 enters and exits the tile 923 by passing through one boundary of the tile 923, the operation unit 10A to 11C obtains the first initial value $WN_{init\_1}$ by adding 0 to the initial winding number of all tiles 933 located at the left side of the tile 923 or by considering the initial winding number as it is.

Although in FIGS. 9A to 9C, the operation unit 10A to 11C adds 1 to the initial winding number when the path passes through the tile clockwise and subtracts 1 from the initial winding number when the path passes through the tile counterclockwise, the present embodiment is not limited thereto. In an example, when the path passes through the tile clockwise, the operation unit 10A to 11C may subtract 1 from the initial winding number, and when the path passes through the tile counterclockwise, the operation unit 10A to 11C may add 1 to the initial winding number.

Referring back to FIG. 8, since the first path $e_0$ is a straight path connected from Vertex $P_0$ to Vertex $P_1$, the first path $e_0$ passes through the two opposite boundaries of the tiles 810 counterclockwise. Accordingly, the operation unit 10A to 11C obtains the first initial value $WN_{init\_1}$ by subtracting 1 from the initial winding number of each of the tiles 821. Among the tiles included in a frame, the initial winding number of each of the tiles except for the tiles 821 may be determined to be the first initial value $WN_{init}$ without a change. The operation unit 10A to 11C may store the first initial value $WN_{init\_1}$ in the local memory 150 according to each tile.

As described above with reference to FIG. 5, when the path data includes information about a plurality of paths, the operation unit 10A to 11C sets the initial value of the tile by sequentially considering the paths. As described above with reference to FIGS. 8 to 9C, since the operation unit 10A to 11C obtains the first initial value $WN_{init\_1}$ based on the position and proceeding direction of the first path $e_0$, the operation unit 10A to 11C obtains the second initial value $WN_{init\_2}$ by updating the first initial value $WN_{init\_1}$ based on the position and proceeding direction of the second path $e_1$.

An example in which the operation unit 10A to 11C selects tiles through which the second path $e_1$ passes from among the tiles included in a frame 910 and obtains the second initial value $WN_{init\_2}$ of each of the tiles is described below with reference to FIGS. 10A to 11C.

Figure 10A:
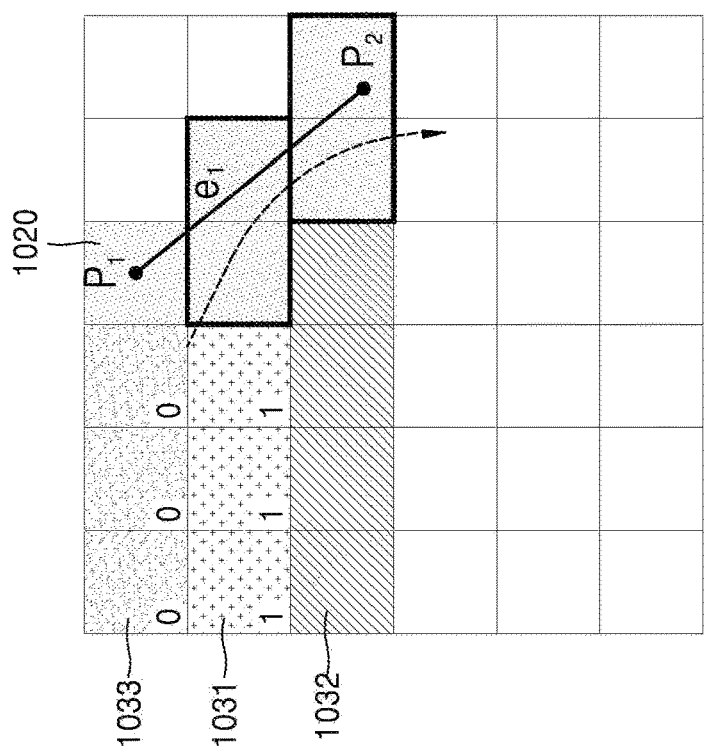
FIGS. 10A and 10B are views for explaining an example in which the operation unit selects tiles, through which a second path passes, from among tiles included in a frame, and obtains a second initial value of each of tiles, according to an embodiment.
Figure 10B:
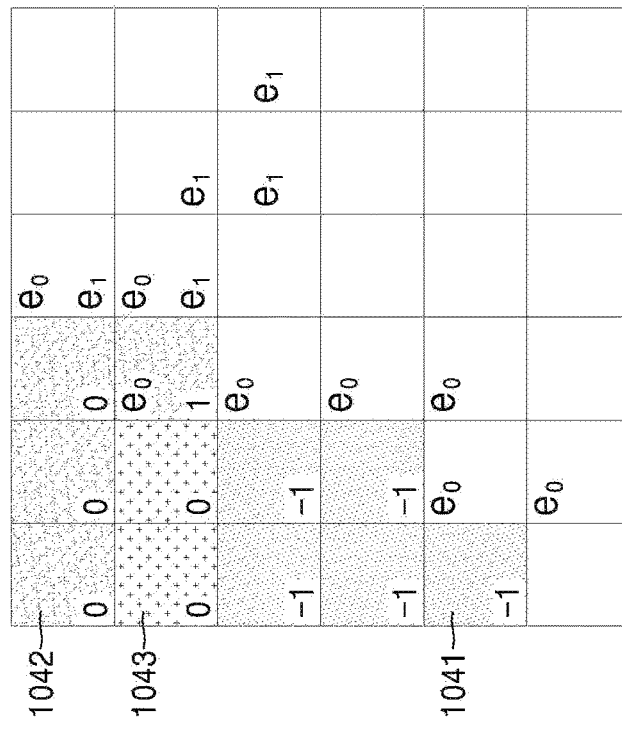

FIGS. 10A and 10B illustrate an example in which the operation unit 10A to 11C according to the present embodiment selects tiles through which the second path $e_1$ passes from among the tiles included in a frame and obtains the second initial value $WN_{init\_2}$ of the tiles.

FIG. 10A illustrates the second path $e_1$. The second path $e_1$ is a straight path from Vertex $P_1$ to Vertex $P_2$. Accordingly, it may be seen that the second path $e_1$ is a clockwise path.

The operation unit 10A to 11C selects tiles 1020 through which the second path $e_1$ passes from among the tiles included in a frame. A method used by the operation unit 10A to 11C to select the tiles 1020 is the same as the method described above with reference to FIGS. 7A to 7E. The operation unit 10A to 11C generates for each of the selected tiles of the tiles 1020 information "Edge_List" indicating that the second path $e_1$ passes through the tile and stores the information in the local memory 150. For a tile for which the information Edge_List is already generated as described above with reference to FIG. 6, information that the second path $e_1$ passes through the tile is additionally stored in the previously generated information Edge_List. "$E_0$, $e_1$" or "$e_1$" marked on the tiles 1020 of FIG. 10B denote information included in the information Edge_List of each of the tiles 1020. In other words, the tile marked with "$e_0$" and "$e_1$" is a tile through which both of the first path $e_0$ and the second path $e_1$ pass. Also, the tile marked with "$e_1$" is a tile through which the second path $e_1$ passes.

The operation unit 10A to 11C assigns the second initial value $WN_{init\_2}$ to each of tiles 1031 located at one side of the tiles 1020 that are selected. A method used by the operation unit 10A to 11C to obtain the second initial value $WN_{init\_2}$ of each of the tiles 1231 is the same as the method described above with reference to FIGS. 8 to 9C. In other words, since the second path $e_1$ passes through the tiles 1020 clockwise, the operation unit 10A to 11C obtains the second initial value $WN_{init\_2}$ by adding 1 to the first initial value $WN_{init\_1}$ of each of the tiles 1031. For the tiles 1033 located at the left side of the tile including the vertex $P_1$ where the second path $e_1$ starts, the operation unit 10A to 11C obtains the second initial value $WN_{init\_2}$ in consideration of the shapes of the first path $e_0$ and the second path $e_1$ passing through the tiles. An example in which the operation unit 10A to 11C obtains the second initial value $WN_{init\_2}$ of each of the tiles 1033 is described below with reference to FIGS. 11A to 12. Among the tiles included in the frame, the first initial value $WN_{init\_1}$ of each of the tiles except for the tiles 1031 is determined to be the second initial value $WN_{init\_2}$ without a change. The operation unit 10A to 11C may store the second initial value $WN_{init\_2}$ in the local memory 150 according to each tile.

Also, as described above with reference to FIG. 8, the operation unit 10A to 11C delays the calculation of the second initial value $WN_{init\_2}$ to the tiles 1032 located at the left side of the tile including Vertex $P_2$ where the second path $e_1$ ends. The operation unit 10A to 11C obtains the third initial value $WN_{init\_3}$ of each of the tiles 1032, considering the shapes of the second path $e_1$ and the third path $e_2$ passing through the tiles.

Figure 11A:
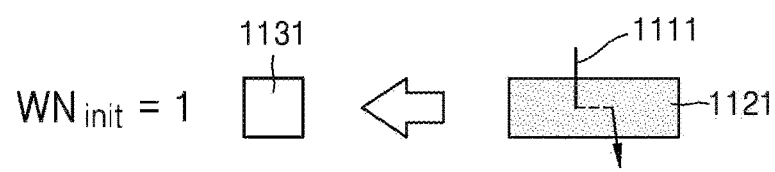
FIGS. 11A to 11C illustrate an example of a rule of assigning an initial value considering proceeding directions of two or more paths, which is performed by the operation unit, according to an embodiment.
Figure 11B:
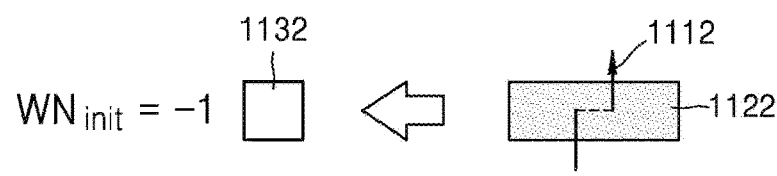
Figure 11C:
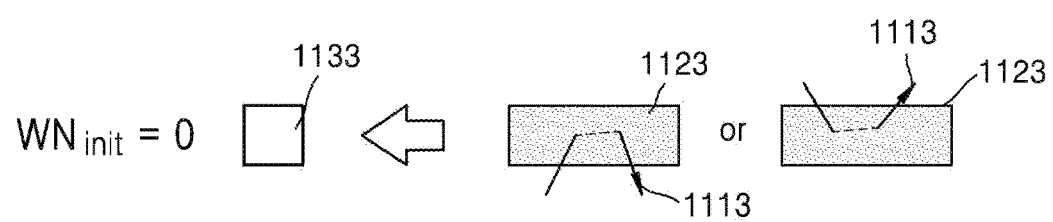

FIGS. 11A to 11C illustrate an example of a rule of assigning an initial value considering the proceeding directions of two or more paths by the operation unit 10A to 11C according to an embodiment.

FIG. 11A illustrates a case in which two or more paths 1111 pass clockwise through two boundaries facing each other of a tile 1121, that is, from top to bottom. FIG. 11B illustrates a case in which two or more paths counterclockwise 1112 pass through two boundaries facing each other of a tile 1122, that is, from bottom to top. FIG. 11C illustrates a case in which two or more paths 1113 enter and exit through one boundary of a tile 1123.

For example, referring to FIGS. 8 to 10, a case in which both of a vertex where the first path $e_0$ ends and a vertex where the second path $e_1$ starts are Vertex $P_1$ corresponds to FIG. 11C.

The tiles 1121, 1122, and 1123 illustrated in FIGS. 11A to 11C may be tiles obtained by combining two or more tiles. For example, when two or more tiles, through which a path passes, are continuously provided in a horizontal directly, the two or more tiles may be considered to be one of the tiles 1121, 1122, and 1123 respectively illustrated in FIGS. 11A to 10A to 11C.

An example of tiles through which three paths pass is described below with reference to FIG. 12.

Figure 12:
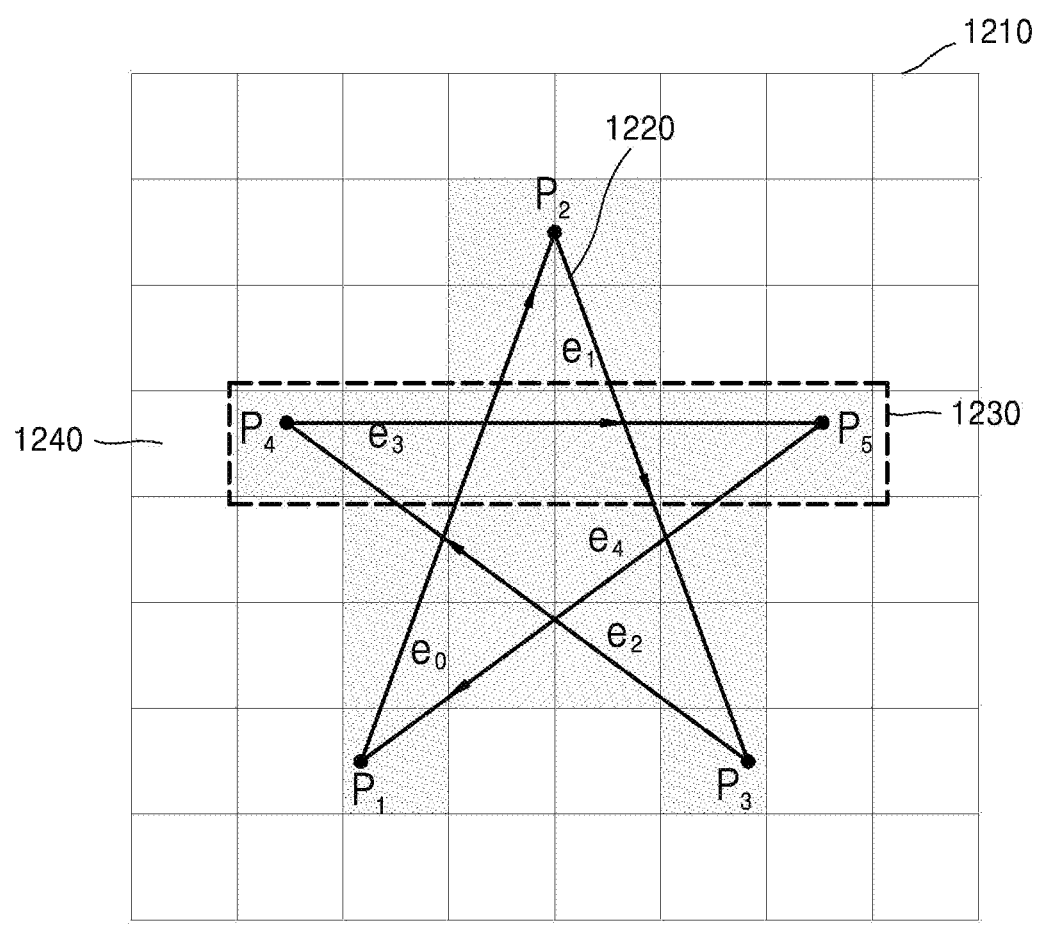
FIG. 12 is a view for explaining an example in which the operation unit sets an initial value of a tile when there are three paths, according to an embodiment.

FIG. 12 illustrates an example in which the operation unit 10A to 11C sets an initial value of a tile through which three paths pass, according to an embodiment.

Referring to FIG. 12, a frame 1210 formed of tiles of 8×8 and an object 1220 having a star shape are illustrated. The object 1220 includes five paths $e_0$, $e_1$, $e_2$, $e_3$, $e_4$, and $e_5$. The path $e_2$ and the path $e_3$ enter some tiles 1230 included in a frame and pass therethrough in a horizontal direction. Since the path $e_2$ and the path $e_3$ do not pass through boundaries facing each other of the tiles 1230 or enter and exit through one boundary, the paths do not fall under the rule of FIGS. 11A to 11C. Accordingly, the initial value $WN_{init}$ of each of the tiles 1240 located at one side, for example, the left side, of the tiles 1230 may not be set to be delayed.

When one path included in the object 1220 enters the tiles 1230, the operation unit 10A to 11C delays setting of the initial value $WN_{init}$ of each of the tiles located at one side of the tiles 1230 until another path included in the object 1220 exits from the tiles 1230. For example, when the path $e_2$ enters the tiles 1230, even if the next path $e_3$ passes through some of the tiles 1230 included in the frame in a horizontal direction, the operation unit 10A to 11C delays the setting of the initial value $WN_{init}$ of each of the tiles located at one side of the tiles 1230. Then, when the path $e_4$ exits from the tiles 1230, the operation unit 10A to 11C sets the initial value $WN_{init}$ of each of the tiles located at one side of the tiles 1230.

In other words, the operation unit 10A to 11C sets the initial value $WN_{init}$ of each of the tiles located at one side of the tiles 1230 according to the shape of three paths of the paths $e_2$, $e_3$, and $e_4$ passing through the tiles 1230. The operation unit 10A to 11C may set the initial value $WN_{init}$ of each of the tiles according to the rule illustrated in FIGS. 11A to 11C.

Referring to FIG. 11A, when two or more paths 1111 pass through the boundaries facing each other of the tile 1121 clockwise (from top to bottom), the operation unit 10A to 11C adds 1 to the initial value or the initial winding number of all tiles 1131 located at the left of the tile 1121.

Referring to FIG. 11B, when two or more paths 1112 pass counterclockwise through the boundaries facing each other of the tile 1122 (from bottom to top), the operation unit 10A to 11C subtracts 1 from the initial value or the initial winding number of all tiles 1132 located at the left of the tile 1122.

Referring to FIG. 11C, when two or more paths 1113 enter and exit one boundary of the tile 1123 clockwise, the operation unit 10A to 11C adds 0 to the initial value or the initial winding number of all tiles 1133 located at the left of the tile 1123 or maintains the initial value or the initial winding number without a change.

Although in FIGS. 11A to 11C, the operation unit 10A to 11C adds 1 to the initial value or the initial winding number when the paths pass through the tile clockwise and subtracts 1 from the initial value or the initial winding number when the paths pass through the tile counterclockwise, the present embodiment is not limited thereto. In an example, when the path passes through the tile clockwise, the operation unit 10A to 11C may subtract 1 from the initial value or the initial winding number, and when the path passes through the tile counterclockwise, the operation unit 10A to 11C may add 1 to the initial value or the initial winding number.

Referring back to FIGS. 8 and 10A, since the path obtained by connecting the first path $e_0$ and the second path $e_1$ enters from a lower side of the tile including Vertex $P_1$ and exits the tile through the lower side. Accordingly, the operation unit 10A to 11C maintains the second initial value $WN_{init\_2}$ of each of the tiles 1033 to be 0 that is the same as the first initial value $WN_{init\_1}$.

FIG. 10B illustrates the second initial value $WN_{init\_2}$ obtained based on the first path $e_0$ and the second path $e_1$. Values "0", "−1", or "1" indicated at the tiles 1041, 1042, and 1043 of FIG. 10B denote the second initial values $WN_{init\_2}$ of the tiles 1041, 1042, and 1043. Also, although not illustrated in FIG. 10B, the second initial value $WN_{init\_2}$ of each of the tiles, except for the tiles 1041, 1042, and 1043, among the tiles included in the frame is 0 that is the same as the initial winding number.

As described above with reference to FIGS. 10A to 11C, since the operation unit 10A to 11C obtains the second initial value $WN_{init\_2}$ based on the position and proceeding direction of the second path $e_1$, the operation unit 10A to 11C sets the third initial value $WN_{init\_3}$ by updating the second initial value $WN_{init\_2}$ based on the position and proceeding direction of the third path $e_2$.

An example in which the operation unit 10A to 11C selects tiles through which the third path $e_2$ passes from among the tiles included in a frame 110A to 11C and obtains the third initial value $WN_{init\_3}$ to the tiles located at one side of the selected tiles is described below with reference to FIGS. 13A and 13B.

Figure 13B:
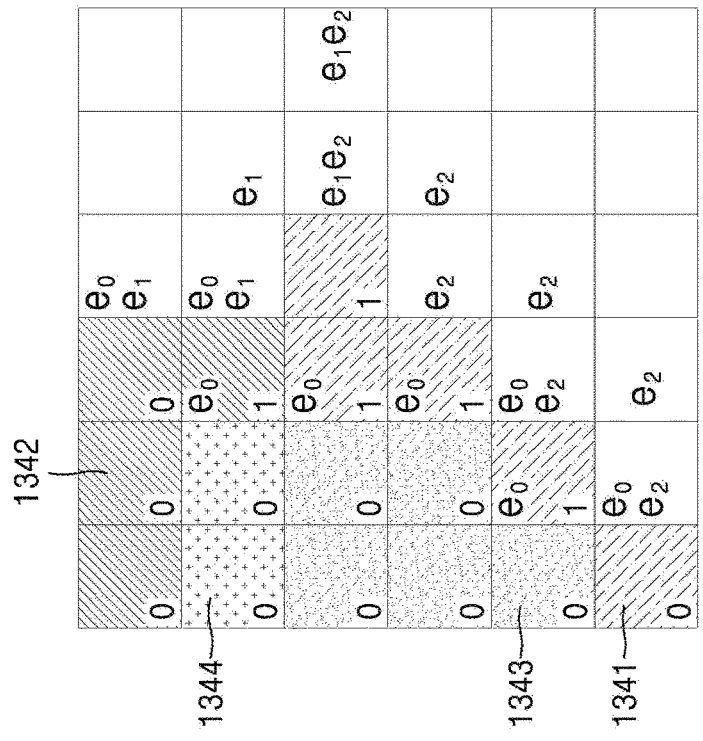
FIGS. 13A and 13B are views for explaining an example in which the operation unit selects tiles through which a third path passes from among tiles included in a frame and obtains a third initial value of each of tiles, according to an embodiment.
Figure 13A:
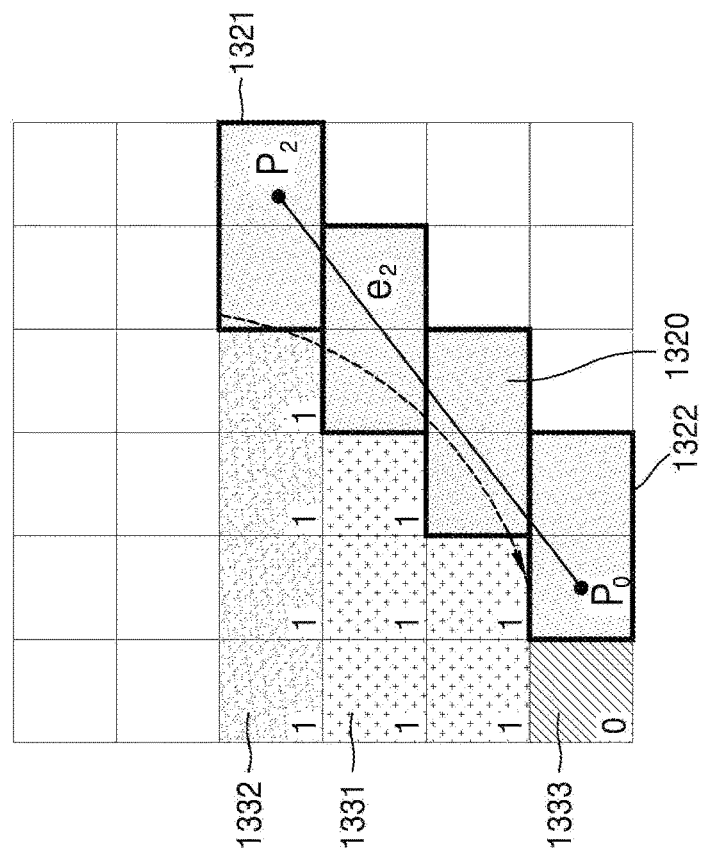

FIGS. 13A and 13B illustrate an example in which the operation unit 10A to 11C selects tiles through which the third path $e_2$ passes among the tiles included in the frame and obtains the third initial value $WN_{init\_3}$ of each of the tiles, according to the present embodiment.

FIG. 13A illustrates the third path $e_2$. The third path $e_2$ is a straight path connected from Vertex $P_2$ to Vertex $P_0$. Accordingly, it may be seen that the third path $e_2$ is a path that rotates clockwise.

The operation unit 10A to 11C selects tiles 1320 through which the second path $e_1$ passes from among the tiles included in the frame. A method in which the operation unit 10A to 11C selects the tiles 1320 is the same as the method described above with reference to FIG. 7. The operation unit 10A to 11C generates for each of the selected tiles of the tiles 1320 information "Edge_List" indicating that the third path $e_2$ passes through the tile and stores the information in the local memory 150. For a tile for which the information Edge_List is already generated as described above with reference to FIG. 6, information that the third path $e_2$ passes is additionally stored in the previously generated information Edge_List. "$E_0, e_2$", "$e_1, e_2$", or "$e_2$" marked on the tiles of FIG. 13B denote information included in the information Edge_List of each of the tiles. In other words, the tile marked with "$e_0$" and "$e_2$" is a tile through which both of the first path $e_0$ and the third path $e_2$ pass. Also, the tile marked with "$e_1$" and "$e_2$" is a tile through which both of the second path $e_1$ and the third path $e_2$ pass. Also, the tile marked with "$e_2$" is a tile through which the third path $e_2$ passes.

The operation unit 10A to 11C obtains the third initial value $WN_{init\_3}$ by updating the second initial value $WN_{init\_2}$ of each of tiles 1331 located at one side of the tiles 1320 that are selected. For example, the operation unit 10A to 11C may obtain the third initial value $WN_{init\_3}$ of each of tiles 1331 at the left side of the tiles 1320 that are selected. A method in which the operation unit 10A to 11C obtains the third initial value $WN_{init\_3}$ of each of the tiles 1331 is the same as the method described above with reference to FIGS. 8 and 9A to 9C. In detail, since the third path $e_2$ passes through the tiles 1320 clockwise, the operation unit 10A to 11C obtains the third initial value $WN_{init\_3}$ by adding 1 to the second initial value $WN_{init\_2}$ of each of the tiles 1331 located at the left side according to the rule of FIG. 9A.

For tiles 1332 located at the left side of the tile including Vertex $P_2$ where the third path $e_2$ starts, the operation unit 10A to 11C determines the third initial value $WN_{init\_3}$ considering the shapes of the second path $e_1$ and the third path $e_2$ passing through the tiles. An example in which the operation unit 10A to 11C determines the third initial value $WN_{init\_3}$ of each of the tiles 1332 is the same as the method described above with reference to FIGS. 11A to 11C. In detail, since the second path $e_1$ and the third path $e_2$ pass clockwise two boundaries facing each other of the tiles 1321 (from top to bottom), the second path $e_1$ and the third path $e_2$ correspond to the case of FIG. 11A. Accordingly, the operation unit 10A to 11C obtains the third initial value $WN_{init\_3}$ by adding 1 to the second initial value $WN_{init\_2}$ of each of the tiles 1332.

Also, for the tile 1333 locates at the left side of the tile including Vertex $P_0$ where the third path $e_2$ ends, the operation unit 10A to 11C determines the third initial value $WN_{init\_3}$ considering the shapes of the third path $e_2$ and the first path $e_0$ passing through the tiles. In detail, since the third path $e_2$ and the first path $e_0$ enter and exit the tile 1122 in the same direction through one side (upper side) of the tile 1322, that is, the upper surface, of the tile 1122, the third path $e_2$ and the first path $e_0$ correspond to the case of FIG. 11C.

Accordingly, the operation unit 10A to 11C determines the second initial value $WN_{init\_2}$ of the tiles 1333 to be the third initial value $WN_{init\_3}$ without a change.

For the tiles except for the tiles 1331, 1332, and 1333 from among the tiles included in the frame, the second initial value $WN_{init\_2}$ is determined to be the third initial value $WN_{init\_3}$ without a change. The operation unit 10A to 11C may store the third initial value $WN_{init\_3}$ in the local memory 150 for each tile.

FIG. 13B illustrates the third initial value $WN_{init\_3}$ obtained based on the first path $e_0$, the second path $e_1$, and the third path $e_2$. Value "0" or "1" indicated at the tiles 1341, 1342, 1343, and 1344 illustrated in FIG. 13B denote the third initial value $WN_{init\_3}$ of each of the tiles 1341, 1342, 1343, and 1344. Also, although not illustrated in FIG. 13B, the third initial value 3 of the tiles except for the tiles 1341, 1342, 1343, and 1344 among the tiles included in the frame is 0 that is the same as the initial winding number.

The operation unit 10A to 11C determines the third initial value $WN_{init\_3}$ to be the first winding number $WN_{init}$. As described above with reference to FIGS. 6A to 13B, the operation unit 10A to 11C determines the third initial value $WN_{init\_3}$ that is obtained by updating the initial winding number, for example, 0, to be the first winding number $WN_{init}$.

According to the descriptions with reference to FIGS. 5 to 13B, the operation unit 10A to 11C sets the first winding number $WN_{init}$ with respect to all tiles included in the frame in consideration of the same side. For example, the operation unit 10A to 11C may set first winding number $WN_{init}$ by adding or subtracting a predetermined value to or from the initial number of each of the tiles existing at the left side of a tile according to a direction in which a path passes through the tile.

When an object is deviated to one side of a frame, the operation unit 10A to 11C may set the first winding number $WN_{init}$ considering different sides for the respective tiles included in the frame. In other words, the operation unit 10A to 11C may set the first winding number $WN_{init}$ considering the position of each of the tiles included in the frame and the position of a path in the frame, which is described below in detail with reference to FIGS. 14 and 15.

Figure 14:
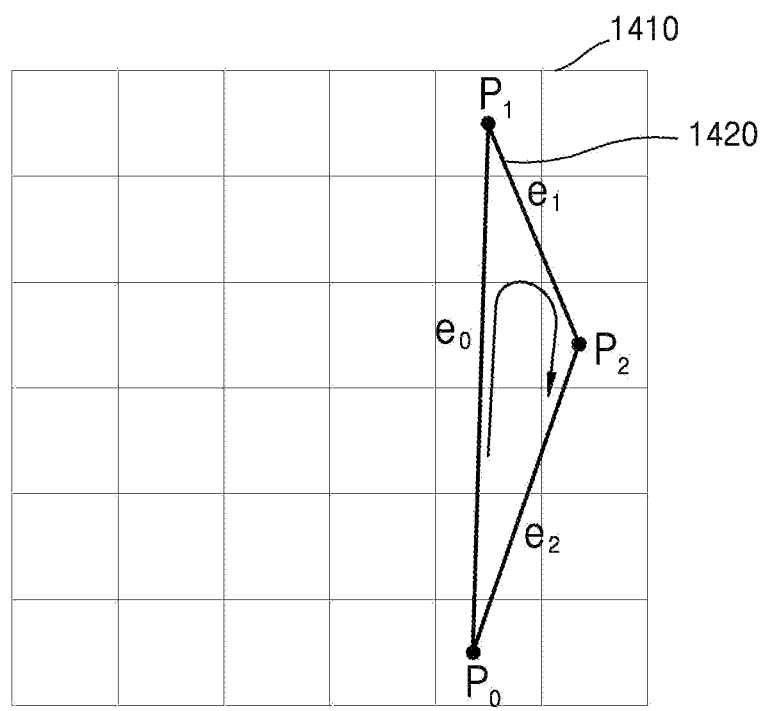
FIG. 14 illustrates examples of paths used by the operation unit to set a first winding number, according to an embodiment.

FIG. 14 illustrates examples of paths used by the operation unit 10A to 11C to set a first winding number, according to an embodiment.

Referring to FIG. 14, a frame 1410 includes tiles of 6×6, and an object 1420 having a triangular shape includes three paths $e_0$, $e_1$, and $e_2$. The object 1420 is deviated to the right side of the frame 1410.

Figure 15:
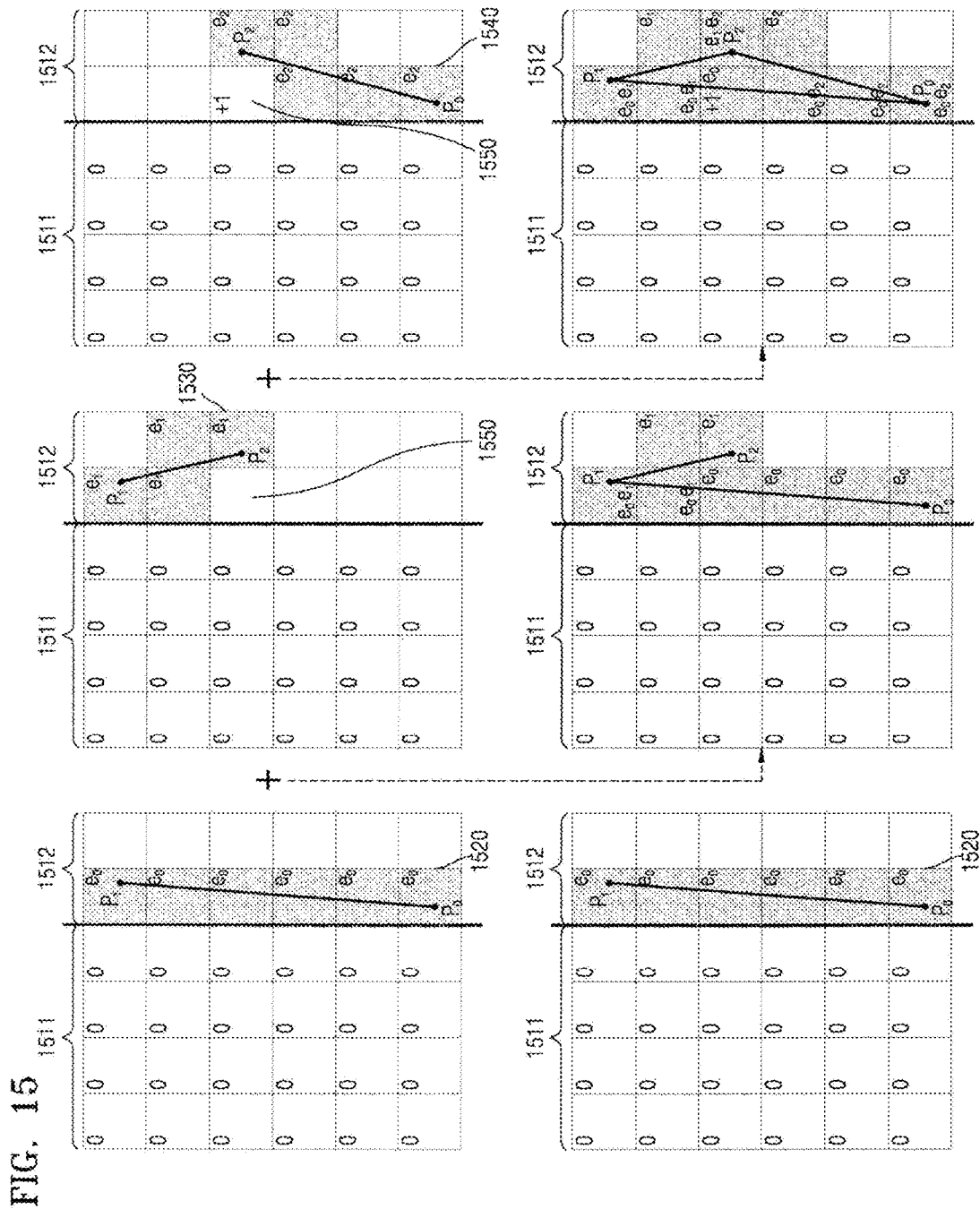
FIG. 15 illustrates examples in which the operation unit sets a first winding number, according to an embodiment.

FIG. 15 illustrates examples in which the operation unit 10A to 11C sets the first winding number, according to an embodiment.

FIG. 15 illustrates examples in which the operation unit 10A to 11C processes the paths of FIG. 14. Referring to FIG. 15, the paths $e_0$, $e_1$, and $e_2$ are sequentially drawn in the frame. In this regard, an object formed by the paths $e_0$, $e_1$, and $e_2$ is deviated to the right side of the frame.

The operation unit 10A to 11C may set the first winding number $WN_{init}$ considering the position of each of the tiles included in the frame and the position of a path in the frame. In detail, it is checked whether the object is deviated to one side of the frame by using information about the paths $e_0$, $e_1$, and $e_2$ included in the path data. When the object is deviated to one side of the frame, the operation unit 10A to 11C divides the frame into a first area 1511 in which the object is not included and a second area 1512 in which the object is included. The operation unit 10A to 11C sets the first winding number $WN_{init}$ by changing a direction for checking a path for each of areas 1511 and 1512. Although FIG. 15 illustrates that the operation unit 10A to 11C is divided into two areas 1511 and 1512, the number of areas by which the operation unit 10A to 11C divides the frame is not limited to two.

First, the operation unit 10A to 11C assigns an initial winding number to all tiles included in the frame. For example, the operation unit 10A to 11C may assign the initial winding number of each of all tiles included in a frame 1510 to 0. Next, the operation unit 10A to 11C may use different sides in obtaining the first winding number $WN_{init}$ of each of the tiles in the first area 1511 and the second area 1512. In an embodiment, the first winding number $WN_{init}$ for the tiles of the first area 1511 facing the left side may be obtained contrary to the descriptions with respect to FIGS. 3 to 13. In this case, since no path exists in the first area 1511, the operation unit 10A to 11C does not add or subtract a predetermined number, for example, 1, to the initial winding number with respect to any tile included in the first area 1511. In other words, the operation unit 10A to 11C sets the first winding number $WN_{init}$ of each of the tiles included in the first area 1511 to the initial winding number, for example, 0.

For the tiles of the second area 1512, contrary to the tiles of the first area 1511, the first winding number $WN_{init}$ facing the right side may be obtained. Thus, the descriptions presented with reference to FIGS. 3 to 13 may be identically applied to the present example. In detail, since no tile exists at the left side of the tiles 1520 through which the path $e_0$ passes, the first winding number $WN_{init}$ is the same as the initial winding number.

For a tile 1550 included in the second area 1512 where the path $e_1$ exists at the left side of a tile 1530, obtaining a second initial number $WN_{init\_2}$ is delayed until the path $e_2$ is considered as a vertex. Thus, the second initial number $WN_{init\_2}$ of each of the tiles of the second area 1512 is the same as the first winding number $WN_{init}$.

The tile 1550 is the only one included in the second 1512 and exists at the left side of the tiles 1540 through which the path $e_2$ passes. In this case, a third initial number $WN_{init\_3}$ is obtained according to the rule of FIG. 11A. In other words, the operation unit 10A to 11C obtains the third initial number $WN_{init\_3}$ of the tile 1550 by adding +1 to the second initial number $WN_{init\_2}$.

Finally, the operation unit 10A to 11C determines the third initial number $WN_{init\_3}$ to be the first winding number $WN_{init}$ for each of the tiles in the second area 1512.

To summarize the above description, an entire image or a partial image is divided into tiles and a first winding number of each of all pixels included in each tile is determined. For a tile through which no path passes, the first winding number that is determined as such is used as a final winding number for each of the pixels. For a tile through which a path passes, a final winding number of each of the pixels is determined by a method described below. In detail, for pixels of a tile through which a path passes, the second initial number $WN_{init\_2}$ is calculated based on the first winding number $WN_{init}$ and the second winding number WN is determined to be the final winding number. In calculating the second winding number WN, the position and proceeding direction of a path existing in each tile and the position of a pixel are considered.

An example in which the operation unit 10A to 11C calculates the second winding number WN of each of the tiles through which a path passes is described with reference to FIGS. 16A to 16C.

Figure 16B:
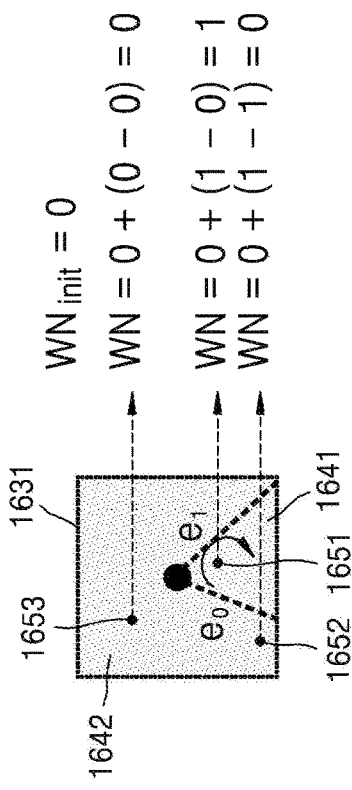
FIGS. 16A to 16C are views for explaining an example in which the operation unit calculates a second winding number of each of tiles, through which a path passes, according to an embodiment.
Figure 16C:
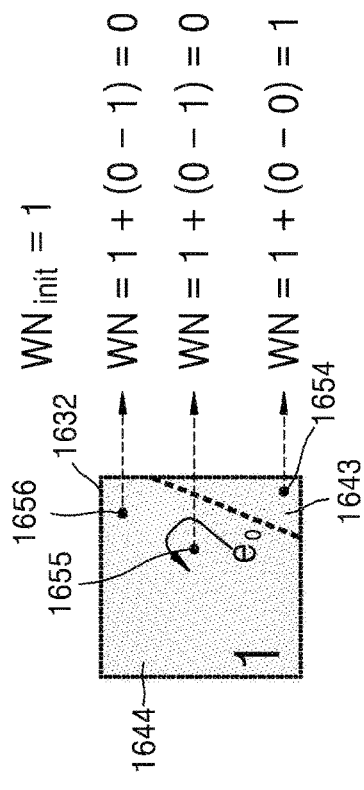
Figure 16A:
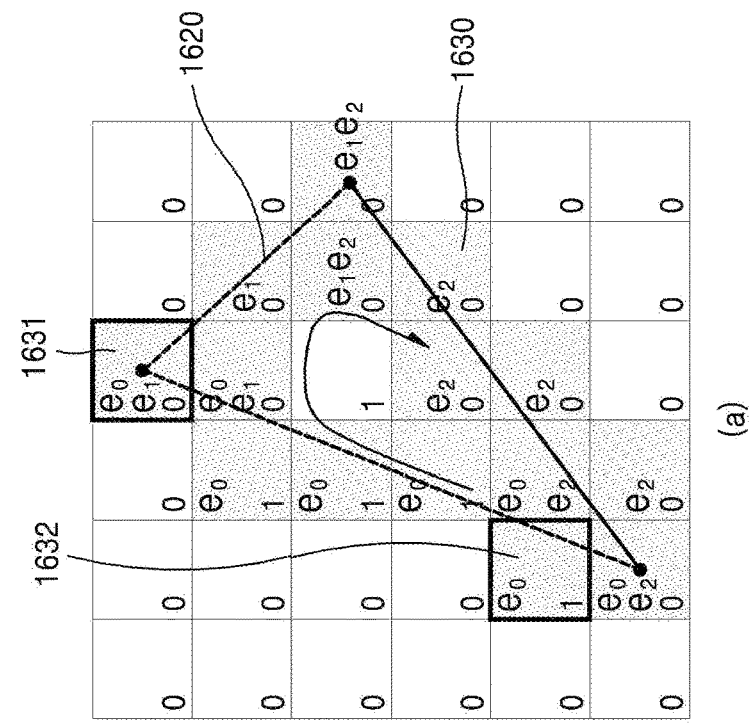

FIGS. 16A to 16C illustrate an example in which the operation unit 10A to 11C calculates the second winding number of each of the tiles, through which a path passes, according to an embodiment.

FIG. 16A illustrates a frame formed of 6×6 tiles and an object 1620 having a triangular shape that is the same as the object 520 illustrated in FIG. 5. Accordingly, as described above with reference to FIGS. 6A to 13B, FIGS. 16A to 16C illustrate a result of the operation unit 10A to 11C selecting tiles 1630, through which the paths $e_0$, $e_1$, and $e_2$ pass, and setting the first winding number $WN_{init}$ to each of the tiles included in the frame.

A single tile includes a plurality of pixels. Accordingly, the winding numbers of the pixels set by the operation unit 10A to 11C may be different from each other in a single tile. In particular, for tiles 1630 through which the paths $e_0$, $e_1$, and $e_2$ pass the winding numbers of pixels included in the tiles 1630 may be different from each other. Accordingly, for the pixels of each of the tiles 1630 including a path, the operation unit 10A to 11C calculates the second winding number WN based on the first winding number $WN_{init}$. The winding number of each of all pixels included in the tiles that do not include a path, except for the tiles 1630, is determined to be the first winding number $WN_{init}$ of the tile. An example of calculating the second winding number WN is described below in detail with reference to FIGS. 16B and 16C.

FIG. 16B illustrates a tile 1631 of the tiles 1630 of FIG. 16A, through which the paths $e_0$, $e_1$, and $e_2$ pass. The internal area of the tile 1631 may be divided into two areas by the first path $e_0$ and the second path $e_1$. In the following description, an area surrounded by the first path $e_0$ and the second path $e_1$ may be referred to as a first area 1641 and an area other than the first area 1641 may be referred to as a second area 1642.

The operation unit 10A to 11C calculates the second winding number WN based on the first winding number $WN_{init}$ of a tile 1631. In detail, the operation unit 10A to 11C may calculate the second winding number WN of the tile 1631 by using the Edge_List of the tile 1631 stored in the local memory 150. The Edge_List of the tile 1631 includes information about the paths $e_0$ and $e_1$ that pass through the tile 1631. Thus, the operation unit 10A to 11C may calculate the second winding number WN based on the positions and the proceeding directions of the paths $e_0$ and $e_1$ that pass through the tile 1631.

For example, the operation unit 10A to 11C may calculate the second winding number WN of the tile 1631, that is, the winding number WN of a pixel included in the tile 1631, according to Equation 1.

$$WN = WN_{init} + (N_{CW} - N_{CCW})$$ [Equation 1]

In Equation 1, "WN" denotes the first winding number of a pixel and "$WN_{init}$" denotes an initial value of a tile including pixels. "$N_{CW}$" denotes a value determined based on a path located at one side of a pixel and proceeding clockwise, that is, from top to bottom. "$N_{CCW}$" denotes a value determined based on a path located at one side of a pixel and proceeding counterclockwise, that is, from bottom to top. The one side of a pixel denotes any one of the left, right, upper, and lower sides with respect to the position of the pixel and the same direction as the direction used for calculating the first winding number. For example, if the first winding number is calculated by using the right direction in FIGS. 6 to 13B, the same right direction is used for calculating the winding number WN of a pixel The operation unit 10A to 11C may calculate the winding number WN of a pixel 1651 included in the first area 1641 to be +1. In detail, the first winding number $WN_{init}$ of the tile 1631 is 0, and $N_{CW}$ is 1 because the second path $e_1$ located at the right side of the pixel 1651 proceeds clockwise. Also, since no path proceeding counterclockwise exists at the right side of the pixel 1651, $N_{CCW}$ of the pixel 1651 is 0. Accordingly, the operation unit 10A to 11C may calculate the winding number WN of the pixel 1651 to be +1 according to Equation 1.

Also, the operation unit 10A to 11C may calculate the winding number WN of a pixel 1652 included in the second area 1642 to be 0. In detail, since the first winding number $WN_{init}$ of the tile 1631 is 0 and the first path $e_0$ located at the right side of the pixel 1652 proceeds counterclockwise, $N_{CCW}$ of the pixel 1652 is 1. Accordingly, the operation unit 10A to 11C may calculate the winding number WN of the pixel 1652 to be 0 according to Equation 1.

Also, the operation unit 10A to 11C may calculate the winding number WN of the pixel 1653 included in the second area 1642 to be 0. In detail, since the first winding number $WN_{init}$ of the tile 1631 is 0 and no path is located at the right side of the pixel 1653, $N_{CW}$ and $N_{CCW}$ are 0. Accordingly, the operation unit 10A to 11C may calculate the winding number WN of the pixel 1653 to be 0 according to Equation 1.

In summary, the winding number WN of each of the pixels included in the first area 1641 of FIG. 16B may be all calculated to be 1, and the winding number WN of each of the pixels included in the second area 1642 may be all calculated to be 0. Accordingly, the winding numbers WN of the pixels, although the pixels are included in the same tile 1631, may be different from each other according to an area divided by the path.

FIG. 16C illustrates another tile 1632 of the tiles 1630 of FIG. 16A, through which the paths $e_0$, $e_1$, and $e_2$ pass. The internal area of the tile 1632 may be divided into two areas by the first path $e_0$. In the following description, When an area surrounded by the first path $e_0$ and the lower and right boundary lines of the tile 1632 is a third area 1643, the winding number of a pixel 1654 of the third area 1643 is 0. In detail, the first winding number of the tile 1632 is 1 and no path exists at the right side of the pixel 1654, and thus, $N_{CW}$ and $N_{CCW}$ are 0. Thus, the operation unit 10A to 11C may calculate the winding number WN of the pixel 1654 to be 1 according to Equation 1.

Also, when an area other than the third area 1643 in the tile 1632 is a fourth area 1644, the winding number of each of the pixels 1655 and 1656 of the fourth area 1644 is 1. In detail, since the first path $e_0$ is located at the right side of the pixel 1655, $N_{CW}$ is 0 and $N_{CCW}$ is 1. Accordingly, the operation unit 10A to 11C may calculate the winding number WN of the pixel 1655 to be 0 according to Equation 1. For a case of the pixel 1656, like the pixel 1655, $N_{CW}$ is 0 and $N_{CCW}$ is 1. The Edge_List of the tile 1632 include information about the position and the proceeding direction of the path $e_0$ that passes through the tile 1632. Although FIG. 16C illustrates that no path exists at the right side of the pixel 1656 in the tile 1632, the operation unit 10A to 11C calculates the winding number of a pixel by using the Edge_List and thus the operation unit 10A to 11C regards that the first path $e_0$ exists at the right side of the pixel 1656. Thus, since $N_{CW}$ and $N_{CCW}$ of the pixel 1656 are 0 and 1, respectively, the operation unit 10A to 11C may calculate the winding number WN of the pixel 1655 to be 0 according to Equation 1.

In conclusion, the winding number WN of each of the pixels included in the third area 1643 of FIG. 16C may be all calculated to be 1, and the winding number WN of each of the pixels included in the fourth area 1644 may be all calculated to be 0.

As described above, unlike the tiles including no path, the winding number of each of pixels included in each of the tiles including a path is determined based on the position of a pixel in the tile and the position and the proceeding direction of a path that passes through the tile.

As described above with reference to FIGS. 1 and 2, the determination unit 120 may determine whether to perform shading based on the winding number of a tile. In other words, the determination unit 120 may determine whether to give a command to perform shading of a pixel to the fragment shader 2731 based on the first winding number and the second winding number WN.

As described above with reference to FIGS. 5 to 16C, the operation unit 10A to 11C sets the first winding number to each of the tiles included in the frame and calculates the second winding number of each of the tiles through which at least one path passes based on the first winding number. As a result, the same result as the operation unit 10A to 11C calculates the winding numbers with respect to all pixels included in the frame is obtained. Accordingly, the determination unit 120 may determine whether to perform shading based on the winding number of each of the pixels included in the frame. The shading may signify setting a color to each of the pixels, but the present embodiment is not limited thereto.

For example, the determination unit 120 determines whether to set a color to each of the pixels by using the winding number of each of the pixels included in the frame. For example, the determination unit 120 may determine whether to set a color to each of the pixels according to a preset rule. The preset rule may be any one of a first rule in which a color value is assigned to pixels having winding numbers that are not 0 and a second rule in which a color value is assigned to pixels having winding numbers that are odd numbers. An example in which the determination unit 120 determines whether to perform shading is described with reference to FIGS. 17A to 17C.

Figure 17B:
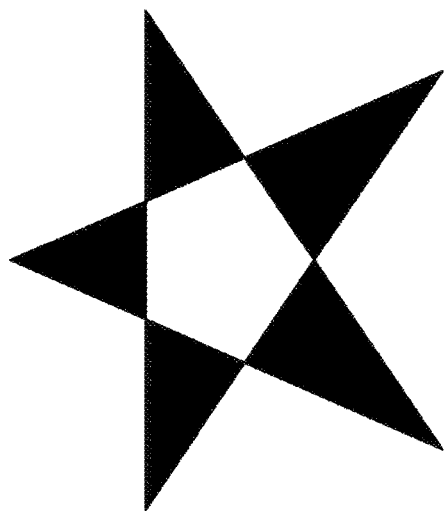
FIGS. 17A to 17C are views for explaining an example in which the determination unit determines whether to perform shading based on a winding number of each of the pixels included in a frame, according to an embodiment.
Figure 17C:
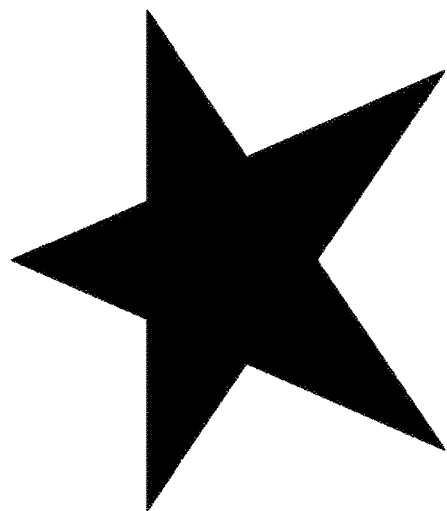
Figure 17A:
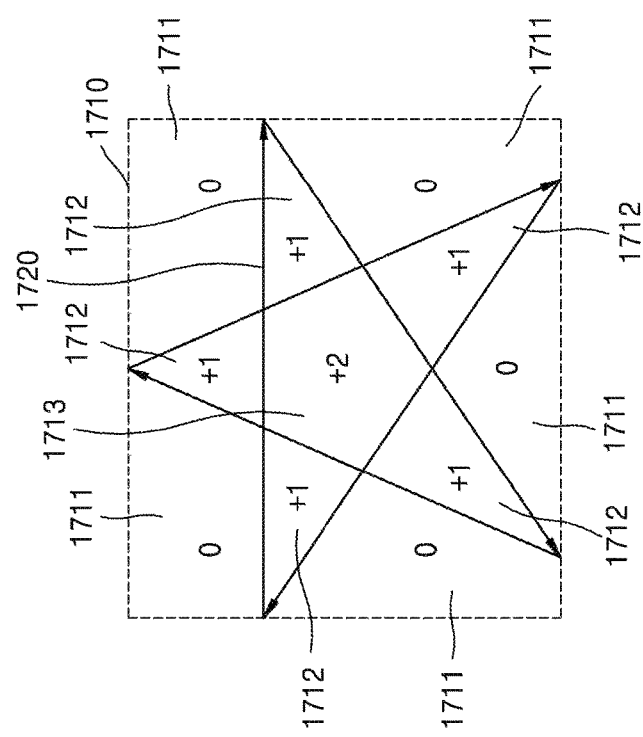

FIGS. 17A to 17C illustrate an example in which the determination unit 120 determines whether to perform shading based on the winding number of each of the pixels included in the frame according to an embodiment.

FIG. 17A illustrates a winding number for each of pixels included in a frame 1710. FIG. 17B illustrates a result of the assignment of color values to the pixels according to a first rule. Also, FIG. 17C illustrates a result of the assignment of color values to the pixels according to a second rule.

Referring to FIG. 17A, the winding numbers of the pixels included in an area 1711 are calculated to be 0, the winding numbers of the pixels included in an area 1712 are calculated to be +1, and the winding numbers of the pixels included in an area 1713 are calculated to be +2.

In an example, the determination unit 120 may determine whether to set a color to each of the pixels according to the first rule. The first rule specifies that a color value is assigned to pixels having winding numbers that are not 0. Referring to FIG. 17B, according to the first rule, the determination unit 120 determines that a color is set to the pixels included in the area 1712 and the area 1713 and a color is not set to the pixels included in the area 1711.

In another example, the determination unit 120 may determine whether to set a color to each of the pixels according to the second rule. The second rule specifies that a color value is assigned to pixels having winding numbers that are odd numbers. In the present example, the odd number means that the absolute value of the winding number of the pixel is an odd number. For example, when a winding number is +3, the winding number is determined to be an odd number. Also, when a winding number is −3, the winding number is determined to be an odd number. When a winding number is 0, the winding number is determined to be an even number. Referring to FIG. 17C, according to the second rule, the determination unit 120 determines that a color is set to the pixels included in the area 1712 of FIG. 17A and a color is not set to the pixels included in the area 1711 and the area 1713.

The determination unit 120 transmits, to the fragment shader 2731, information about the pixels that are determined to set a color. The fragment shader 2731 assigns a color value to pixels that are determined by the determination unit 120 to set a color.

According to the above description, since the apparatus 100 calculates the second winding number only for the tiles, through which the path passes, among the pixels included in the frame, the calculation speed of the rendering apparatus 100 may be improved.

Also, the rendering apparatus 100 may operate the winding number of each pixel without using the stencil buffer. Accordingly, the problems of excessive generation of data input to/output from memory due to use of the stencil buffer and generation of redundant data input to/output from memory due to use of the stencil buffer may be solved.

Also, since the rendering apparatus 100 generates the winding number in parallel with respect to each of the pixels included in the frame, path rendering may be performed at high speed and thus high resolution rendering may be achieved over a short period of time.

Figure 18:
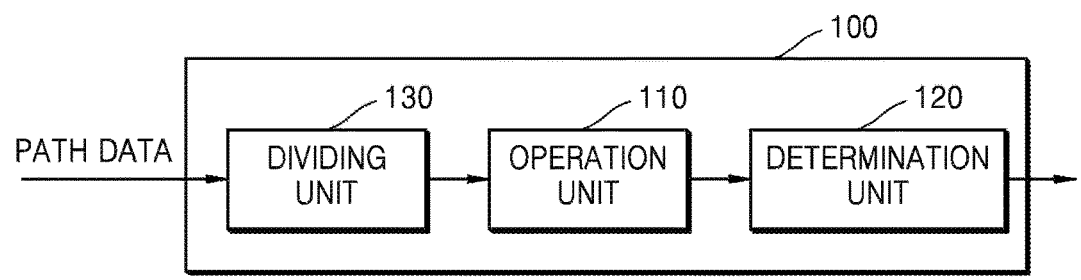
FIG. 18 is a block diagram illustrating a structure of a rendering apparatus according to another embodiment.

FIG. 18 is a block diagram illustrating a structure of the rendering apparatus 100 according to another embodiment.

Referring to FIG. 18, the rendering apparatus 100 further includes a dividing unit 130 in addition to the operation unit 10A to 11C and the determination unit 120.

An example of the operations of the operation unit 10A to 11C and the determination unit 120 is as described above with reference to FIGS. 1 to 17. Accordingly, a detailed description thereof is omitted in the following description.

When a path is a non-monotonic curve, the dividing unit 130 divides the non-monotonic curve into a plurality of monotonic curves. For example, the dividing unit 130 may divide a monotonic curve into monotonic curves based on the de Casteljau's algorithm. When the path data includes information about a non-monotonic curve, the dividing unit 130 changes information about a non-monotonic curve to information about monotonic curves. The dividing unit 130 transmits the information about monotonic curves to the operation unit 10A to 11C. The operation unit 10A to 11C selects a tile, through which the monotonic curves pass, among the tiles included in the frame, and sets the first winding number $WN_{init}$ of each of the tiles included in the frame.

An example in which the dividing unit 130 divides a non-monotonic curve into a plurality of monotonic curves is described below with reference to FIGS. 19A and 19B.

Figure 19A:
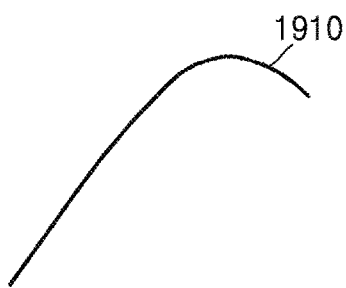
FIGS. 19A and 19B are view for explaining an example in which a dividing unit operates according to an embodiment.
Figure 19B:
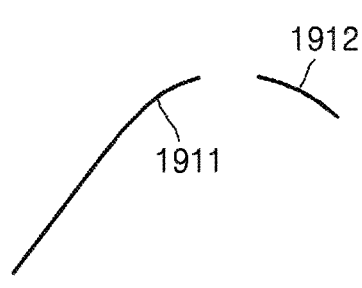

FIGS. 19A and 19B illustrate an example in which the dividing unit 130 operates according to an embodiment.

FIG. 19A illustrates a non-monotonic curve 1910. The path described above with reference to FIGS. 4 to 17C has a positive inclination value or a negative inclination value. If it is assumed that the path described with reference to FIGS. 4 to 17C exists on a two-dimensional coordinate plane, as an x-coordinate component of a path increases, a y-coordinate component of the path always increases or always decreases. However, in the non-monotonic curve 1910 of FIG. 19A, when the x-coordinate component of the non-monotonic curve 1910 increases, the y-coordinate component of the non-monotonic curve 1910 may not always increase or not always decrease. Accordingly, when the path data includes the information about the non-monotonic curve 1910, the operation unit 10A to 11C may not accurately calculate the first winding number $WN_{init}$ or the second winding number WN of each of the tiles included in the frame.

FIG. 19B illustrates two monotonic curves 1911 and 1912. The monotonic curves 1911 and 1912 illustrated in FIG. 19B are curves obtained by dividing the non-monotonic curve 1910 illustrated in FIG. 19A. Assuming that the monotonic curves 1911 and 1912 exist on a two-dimensional coordinate plane, when the x-coordinate component of the monotonic curve 1911 increases, the y-coordinate component of the monotonic curve 1911 always increases. Also, when the x-coordinate component of the monotonic curve 1912 increases, the y-coordinate component of the monotonic curve 1912 always decreases. In other words, in the monotonic curve 1911 or 1912, when the x-coordinate component increases, the y-coordinate component always increases or always decreases. Accordingly, when the path data includes the information about the monotonic curve 1911 or 1912, the operation unit 10A to 11C may accurately calculate the first winding number $WN_{init}$ or the second winding number WN of each of the tiles included in the frame.

When the path data includes the information about the non-monotonic curve 1910, the dividing unit 130 divides the non-monotonic curve 1910 into two or more monotonic curves 1911 and 1912. In other words, the dividing unit 130 converts the information about the non-monotonic curve 1910 included in the path data to information about the two or more monotonic curves 1911 and 1912. Accordingly, even when the path data includes the information about the non-monotonic curve 1910, the operation unit 10A to 11C and the determination unit 120 may perform the above operation described with reference to FIGS. 4 to 17C.

For example, the dividing unit 130 may divide the non-monotonic curve 1910 into the monotonic curves 1911 and 1912 based on the de Casteljau's algorithm. The de Casteljau's algorithm signifies an algorithm used to divide one Bezier curve into two or more Bezier curves. Since the de Casteljau's algorithm is well known to those skilled in the art, a detailed description thereof is omitted.

An example in which the rendering apparatus 100 operates when the path data includes information about a non-monotonic curve is described below with reference to FIGS. 20 to 23B.

Figure 20:
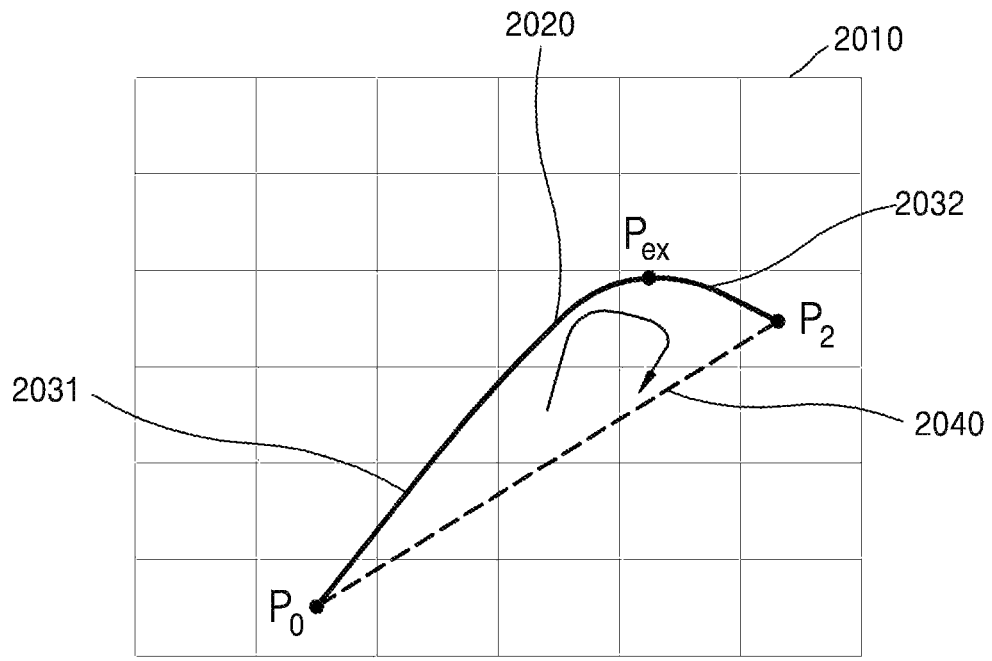
FIG. 20 is a graph showing an example of a nonmonotonic curve included in path data according to an embodiment.

FIG. 20 illustrates an example of a non-monotonic curve included in the path data according to an embodiment.

Referring to FIG. 20, a frame 2010 includes 6×6 tiles and a non-monotonic curve 2020 includes three vertexes $P_0$, $P_{ex}$, and $P_2$. The non-monotonic curve 2020 is assumed to be a curve that passes Vertex $P_{ex}$ from Vertex $P_0$ as a start vertex to Vertex $P_2$ as an end vertex. The dividing unit 130 divides the non-monotonic curve 2020 into a plurality of monotonic curves. For example, the dividing unit 130 may divide the non-monotonic curve 2020 into a first monotonic curve 2031 from Vertex $P_0$ to Vertex $P_{ex}$ and a second monotonic curve 2032 from Vertex $P_{ex}$ to Vertex $P_2$. Vertex $P_{ex}$ denotes a point where inclination of the non-monotonic curve 2020 changes from positive (+) to negative (−).

The dividing unit 130 may select a vertex where the inclination of the non-monotonic curve is changed from positive (+) to negative (−) or vice versa among the vertexes included in the non-monotonic curve and divide the non-monotonic curve with respect to the selected vertex. Accordingly, the non-monotonic curve may be divided into two or more monotonic curves.

On the other hand, the path data may include information about Vertex $P_0$ that is a start point of the non-monotonic curve 2020 and Vertex $P_2$ that is an end point of the non-monotonic curve 2020, and a command to render a curve from Vertex $P_0$ to Vertex $P_2$. However, even when the path data does not clearly include a command to render a path 2040, for example, a straight line, from Vertex $P_2$ to Vertex $P_0$, the path 2040 from Vertex $P_2$ to Vertex $P_0$ may be automatically added. Accordingly, when the path data include the information indicating the non-monotonic curve 2020, an object including the non-monotonic curve 2020 and the path 2040 from Vertex $P_2$ to Vertex $P_0$ may be rendered in the frame 2010.

Accordingly, the operation unit 10A to 11C may set the first winding number $WN_{init}$ to each of the tiles included in the frame 2010 according to the method described above with reference to FIGS. 6A to 13. The operation unit 10A to 11C may calculate the second winding number WN of each of the tiles through which at least one of the first and second monotonic curves 2031 and 2032 and the path 2040 passes according to the method described with reference to FIGS. 16A to 16C. The determination unit 120 may determine whether to perform shading with respect to each of the pixels included in the frame according to the above-described method with reference to FIGS. 17A to 17C.

Figure 22B:
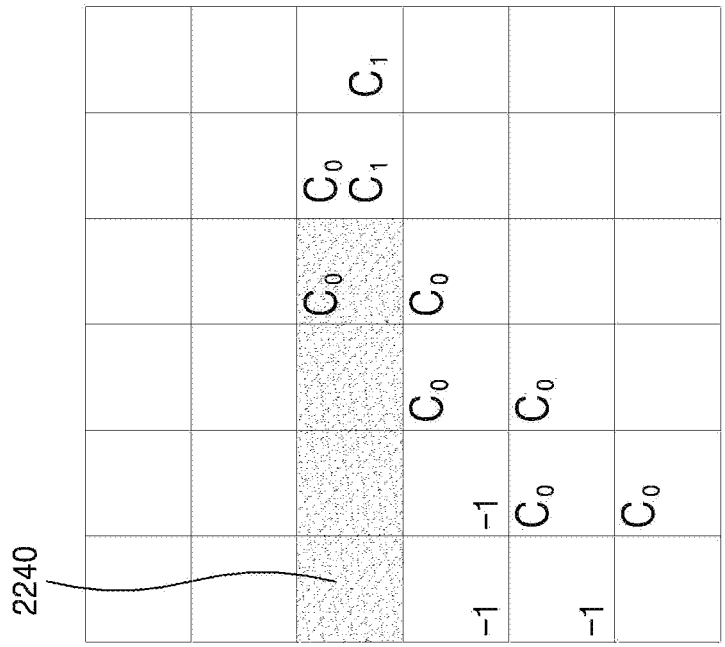
FIGS. 22A and 22B are views for explaining an example in which the operation unit updates a first initial value of each of predetermined tiles to a second initial value by using a second monotonic curve of FIG. 20, according to an embodiment.
Figure 22A:
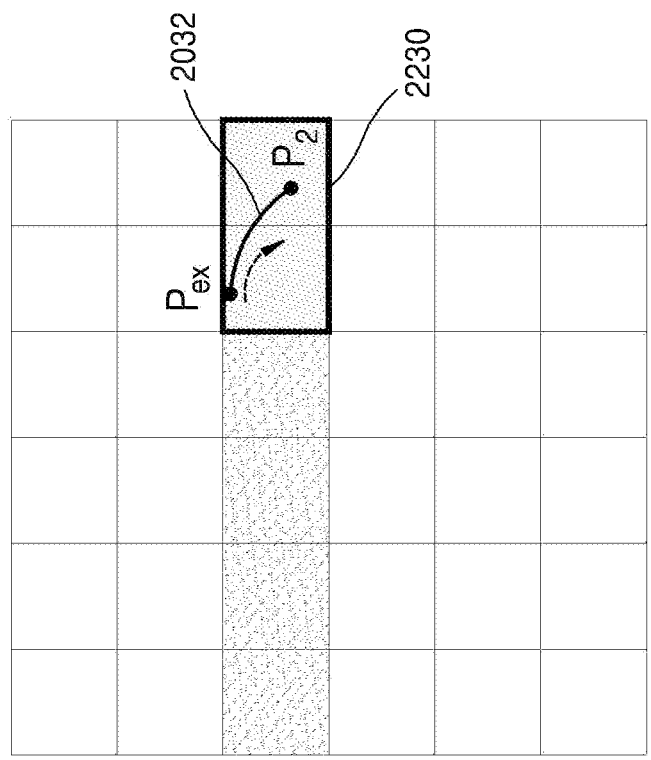
Figure 23A:
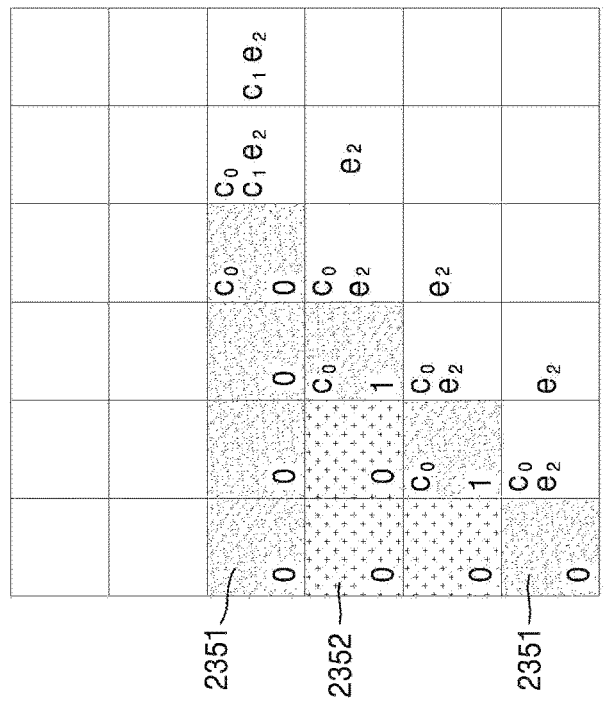
FIGS. 23A and 23B are views for explaining an example in which the operation unit updates a second initial value of each of predetermined tiles to a third initial value by using a path from Vertex $P_2$ to Vertex $P_0$ illustrated in FIG. 20, according to an embodiment.
Figure 23B:
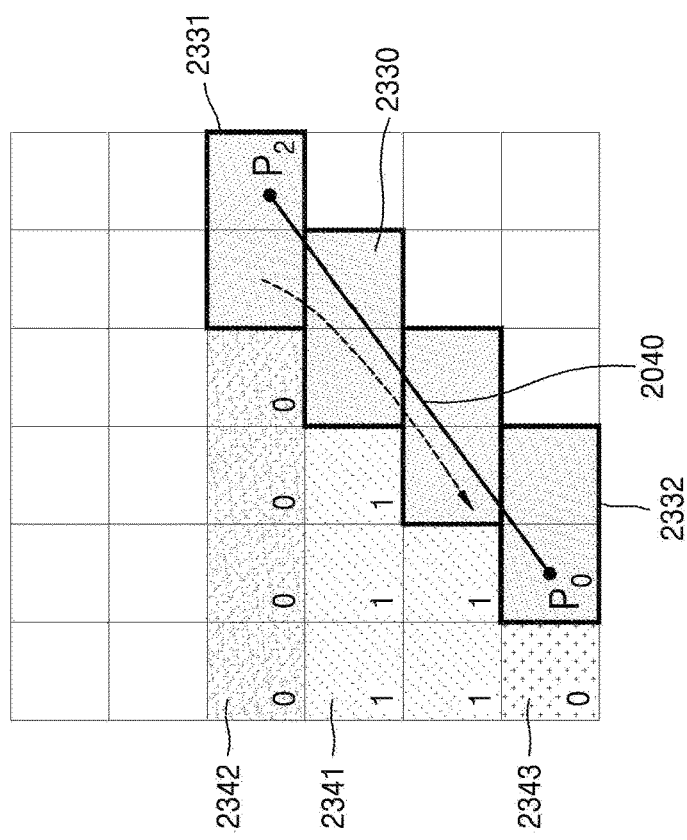

An example in which the operation unit 10A to 11C sets a first winding number $WN_{init}$ to each of the tiles included in the frame by using the paths illustrated in FIG. 20, that is, the first monotonic curve 2031, the second monotonic curve 2032, and the path 2040 from Vertex $P_2$ to Vertex $P_0$ is described below with reference to FIGS. 21A to 23B. In detail, in FIGS. 21A and 21B, the operation unit 10A to 11C updates the initial winding number of each of predetermined tiles to the first initial value $WN_{init\_1}$ by using the first monotonic curve 2031. In FIGS. 22A and 22B, the operation unit 10A to 11C updates the first initial value $WN_{init\_1}$ of each of predetermined tiles to the second initial value $WN_{init\_2}$ by using the second monotonic curve 2032. In FIGS. 23A and 23B, the operation unit 10A to 11C updates the second initial value $WN_{init\_2}$ of each of predetermined tiles to the third initial value $WN_{init\_3}$ by using the path 3040 from Vertex $P_2$ to Vertex $P_0$.

The operation unit 10A to 11C sets the third initial value $WN_{init\_3}$ of the tiles included in the frame 2010 to be the first winding number $WN_{init}$ of all tiles included in the frame 2010. As described above with reference to FIG. 5, the initial winding number, for example, 0, is assigned to all tiles included in the frame 2010.

Figure 21B:
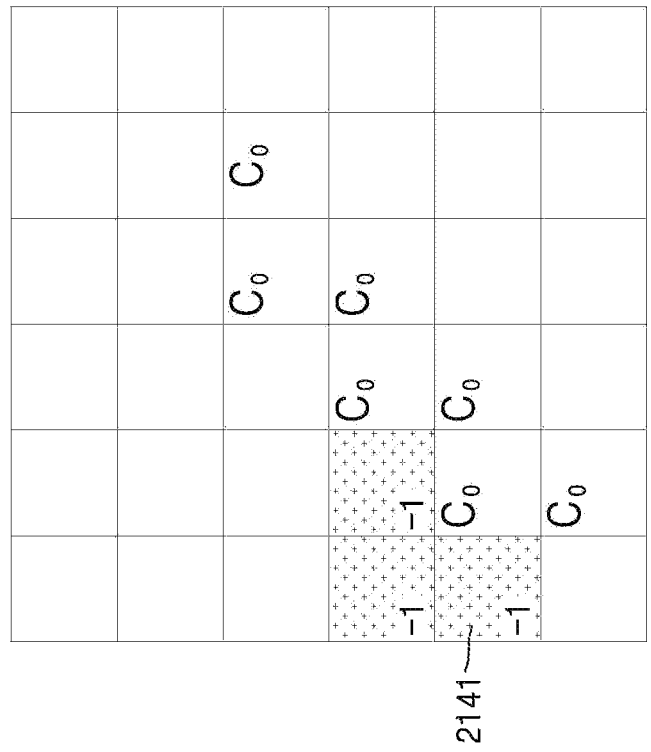
FIGS. 21A and 21B are views for explaining an example in which the operation unit updates an initial winding value of each of predetermined tiles to a first initial value by using a first monotonic curve of FIG. 20, according to an embodiment.
Figure 21A:
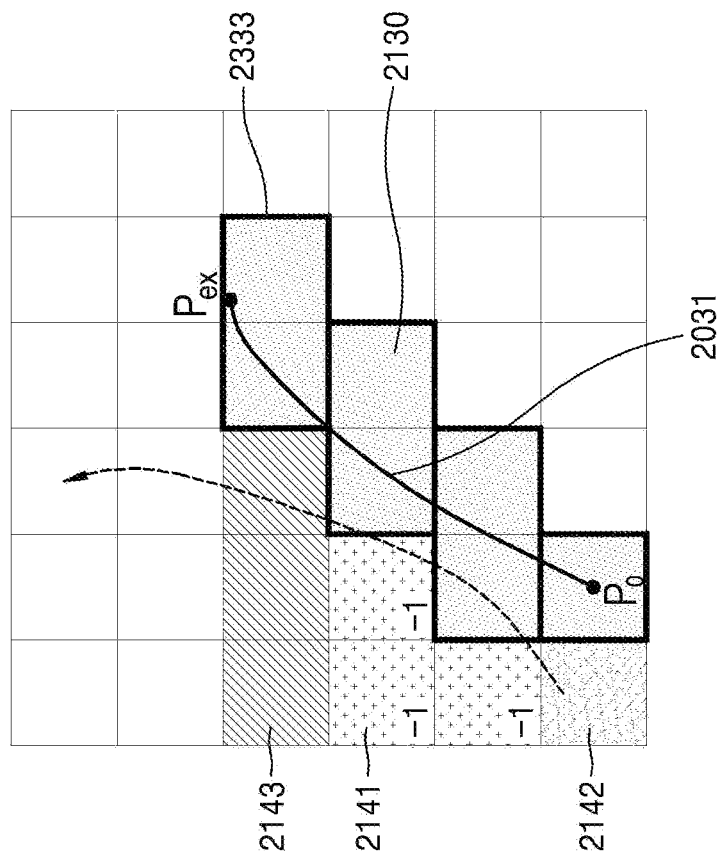

FIGS. 21A and 21B illustrate an example in which the operation unit 10A to 11C updates the initial value of each of predetermined tiles to the first initial value by using the first monotonic curve 2031 illustrated in FIG. 20 according to an embodiment.

FIG. 21A illustrates a first monotonic curve 2031. The first monotonic curve 2031 is a curved path connected from Vertex $P_0$ to Vertex $P_{ex}$. Accordingly, the first monotonic curve 2031 may be a path proceeding counterclockwise.

The operation unit 10A to 11C selects tiles 2130, through which the first monotonic curve 2031 passes, among the tiles included in a frame. A method in which the operation unit 10A to 11C selects the tiles 2130 is the same as the method described above with reference to FIGS. 7A to 7E. The operation unit 10A to 11C generates information "Edge_List" indicating that the first monotonic curve 2031 passes through the tile, for each of the selected tiles of the tiles 2130, and stores the information in the local memory 150. "$C_0$" marked on the tiles 2130 of FIG. 21B denotes information included in the information Edge_List of each of the tiles 2130. In other words, the tile marked with "$C_0$" is a tile, through which the first monotonic curve 2031 passes.

The operation unit 10A to 11C updates the initial winding number of each of tiles 2141 located at one side of the selected tiles 2130 to the first initial value $WN_{init\_1}$. For example, the operation unit 10A to 11C may update the initial winding number of each of the tiles 2141 at the left side of the selected tiles 2130 to the first initial value $WN_{init\_1}$. A method in which the operation unit 10A to 11C updates the initial winding number of each of the tiles 2141 to the first initial value $WN_{init\_1}$ is the same as the method described above with reference to FIGS. 9A and 9C. In other words, since the first monotonic curve 2031 passes through the tiles 2130 counterclockwise, the operation unit 10A to 11C obtains the first initial value $WN_{init\_1}$ by subtracting 1 from the initial winding number of each of the tiles 2141. The updating of the first initial value $WN_{init\_1}$ of each of the tiles 2142 and 2143 located at the left side of Vertex $P_0$ and Vertex $P_2$ is delayed as described above. Accordingly, the initial winding number of each of the tiles included in the frame, except for the tiles 2141, is determined to be the first initial value $WN_{init\_1}$. The operation unit 10A to 11C may store the first initial value $WN_{init\_1}$ in the local memory 150 according to each of the tiles.

FIGS. 22A and 22B illustrate an example in which the operation unit 10A to 11C updates the first initial value of each of predetermined tiles to the second initial value by using the second monotonic curve 2032 of FIG. 20 according to an embodiment.

FIG. 22A illustrates a second monotonic curve 2032. The second monotonic curve 2032 is a curved path connected from Vertex $P_{ex}$ to Vertex $P_2$. Accordingly, the second monotonic curve 2032 may be a path proceeding clockwise.

The operation unit 10A to 11C selects tiles 2230 through which the second monotonic curve 2032 passes from among the tiles included in a frame 2210. A method used by the operation unit 10A to 11C to select the tiles 2230 is the same as the method described above with reference to FIGS. 7A to 7E. The operation unit 10A to 11C generates information "Edge_List" indicating that the second monotonic curve 2032 passes through the tile, for each of the selected tiles of the tiles 2230, and stores the information in the local memory 150. As described above with reference to FIG. 21A, for the tile in which the information "Edge_List" is already generated, information indicating that the second monotonic curve 2032 passes is additionally stored in the previously generated information "Edge_List". The tile marked with "$C_0$" and "$C_1$" in FIG. 22B is a tile, through which both of the first monotonic curve 2031 and the second monotonic curve 2032 pass. Also, the tile marked with "$C_0$" is a tile, through which the first monotonic curve 2031 passes. The tile marked with "$C_1$" is a tile, through which the second monotonic curve 2032 passes.

The operation unit 10A to 11C updates the first initial value $WN_{init\_1}$ of each of tiles 2240 located at one side of the selected tiles 2230 to the second initial value $WN_{init\_2}$. However, the second monotonic curve 2032 passes through the tiles 2230 horizontally. Accordingly, as described above with reference to FIG. 12, the operation unit 10A to 11C delays the setting of the second initial value $WN_{init\_2}$ to the tiles 2240 and assigns the third initial value $WN_{init\_3}$ to each of the tiles 2240 according to a shape of a single path obtained by connecting the second monotonic curve 2032 and the path from Vertex $P_2$ to Vertex $P_0$ passing through the tiles 2230.

FIGS. 23A and 23B illustrate an example in which the operation unit 10A to 11C updates the second initial value of each of predetermined tiles to the third initial value by using a path 2040 from Vertex $P_2$ to Vertex $P_0$ illustrated in FIG. 20 according to an embodiment.

FIG. 23A illustrates the path 2040 from Vertex $P_2$ to Vertex $P_0$. The path 2040 from Vertex $P_2$ to Vertex $P_0$ is a path proceeding clockwise.

The operation unit 10A to 11C selects tiles 2330 through which the path 2040 passes from among the tiles included in a frame 2310. A method used by the operation unit 10A to 11C to select the tiles 2330 is the same as the method described above with reference to FIGS. 7A to 7E. The operation unit 10A to 11C generates information "Edge_List" indicating that the path 2040 passes through the tile, for each of the selected tiles 2330, and stores the information in the local memory 150. As described above with reference to FIG. 22A, for the tile in which the information "Edge_List" is already generated, information indicating that the path 2040 passes is additionally stored in the previously generated information "Edge_List". The tile marked with "$C_0$" and "$e_2$" in FIG. 23B is a tile, through which both of the first monotonic curve 2031 and the path 2040 pass. Also, the tile marked with "$C_0$" is a tile, through which the first monotonic curve 2031 passes. The tile marked with "$C_1$" and "$e_2$" is a tile through which both of the second monotonic curve 2032 and the path 2040 pass. The tile marked with "$C_0$", "$C_1$", and "$e_2$" is a tile through which all of the first monotonic curve 2031, the second monotonic curve 2032, and the path 2040 pass.

The operation unit 10A to 11C updates the second initial value $WN_{init\_2}$ of each of tiles 2341 located at one side of the selected tiles 2330 to the third initial value $WN_{init\_3}$. For example, the operation unit 10A to 11C may update the second initial value $WN_{init\_2}$ of each of the tiles 2341 located at the left side of the selected tiles 2330 to the third initial value $WN_{init\_3}$. A method in which the operation unit 10A to 11C updates the third initial value $WN_{init\_3}$ to each of the tiles 2341 is the same as the method described above with reference to FIGS. 13A and 13B. In other words, since the path 2040 passes through the tiles 2330 clockwise, the operation unit 10A to 11C obtains the third initial value $WN_{init\_3}$ by adding 1 to the second initial value $WN_{init\_2}$ of each of the tiles 2341.

On the other hand, for tiles 2342 located at the left side of the tile including Vertex $P_2$ where the path 2040 starts, the operation unit 10A to 11C assigns the third initial value $WN_{init\_3}$, considering a shape of the second monotonic curve 2032 and the path 2040 passing through the tile. A method used by the operation unit 10A to 11C to update the third initial value $WN_{init\_3}$ to each of the tiles 2342 is the same as the method described above with reference to FIGS. 11A to 11C. In detail, referring to FIGS. 21A, 22A, and 23A, since the first monotonic curve 2031, the second monotonic curve 2032, and the path 2040 enters and exits through one boundary of a tile obtained by combining the tile 2331 and the tile 2333, the operation unit 10A to 11C determines the third initial value $WN_{init\_3}$ by maintaining the initial winding number of each of the tiles 2342. The operation unit 10A to 11C may store the third initial value $WN_{init\_3}$ in the local memory 150 according to each tile.

Also, for tiles 2343 located at the left side of a tile including Vertex $P_0$ where the path 2040 ends, the operation unit 10A to 11C updates the third initial value $WN_{init\_3}$, considering a shape of the path 2040 and the first monotonic curve 2031 passing through the tile. A method in which the operation unit 10A to 11C assigns the third initial value $WN_{init\_3}$ to the tiles 2343 is the method described above with reference to FIGS. 11A to 11C. In detail, since a single path obtained by combining the path 2040 and the first monotonic curve 2031 enters and exits the tiles 2343 through one boundary of the tiles 2343, the operation unit 10A to 11C assigns 0 as the third initial value $WN_{init\_3}$ to each of the tiles 2343. The operation unit 10A to 11C may store the third initial value $WN_{init\_3}$ of the tiles 2343 in the local memory 150.

The second initial value $WN_{init\_2}$ of each of the tiles included in the frame, except for the tiles 2341, 2342, and 2343, is determined to be the third initial value $WN_{init\_3}$. The operation unit 10A to 11C may store the third initial value $WN_{init\_3}$ for each tile in the local memory 150.

FIG. 23B illustrates the third initial value $WN_{init\_3}$.

"0" or "1" marked on each of the tiles 2351 and 2352 illustrated in FIG. 23B denotes the third initial value $WN_{init\_3}$ of each of the tiles 2351 and 2352. Also, although not illustrated in FIG. 23B, the third initial value $WN_{init\_3}$ of the tiles included in the frame, except for the tiles 2351 and 2352, is 0, which is the same as the initial winding number.

The operation unit 10A to 11C determines the third initial value $WN_{init\_3}$ to be the first winding number $WN_{init}$. As described above with reference to FIGS. 21A and 23B, the operation unit 10A to 11C determines the third initial value $WN_{init\_3}$ obtained by updating the initial winding number, for example, 0, to be the first winding number $WN_{init}$.

As described above with reference to FIGS. 19A to 23B, the operation unit 10A to 11C may set the first winding numbers of all tiles even when the path data includes information about a non-monotonic curve. Also, as described above with reference to FIG. 16, the winding number corresponding to each of pixels of a tile through which a path passes may be calculated by using the first winding number. The determination unit 120 may determine whether to perform shading with respect to each of the pixels included in the frame by using the calculated winding number of pixels. Accordingly, the rendering apparatus 100 may accurately perform path rendering even in the case of a non-monotonic curve.

Figure 24A:
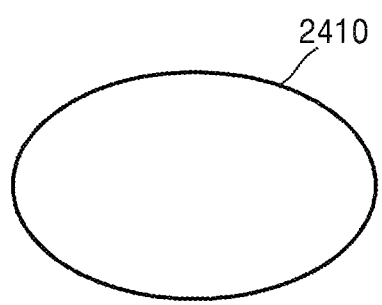
FIGS. 24A and 24B are views for explaining an example in which the dividing unit converts a circular path to a cubic curve according to an embodiment.
Figure 24B:
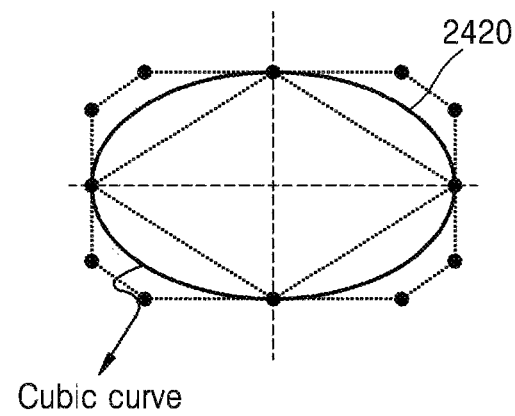

FIGS. 24A and 24B illustrate an example in which the dividing unit 130 converts a circular path to a cubic curve according to an embodiment.

FIG. 24A illustrates an oval path 2410. FIG. 24B illustrates a cubic curve or a cubic Bezier curve 2420. When the path data received by the rendering apparatus 100 includes information about the oval path 2410, the dividing unit 130 may converts the oval path 2410 to the cubic Bezier curve 2420. The dividing unit 130 may divide the cubic Bezier curve 2420 to a plurality of monotonic curves. Accordingly, the rendering apparatus 100 may accurately perform path rendering even in the case of the oval path 2410.

Although in the above description the oval path 2410 is described as an example for convenience of explanation, the dividing unit 130 may convert a circular path to a cubic curve.

Figure 25:
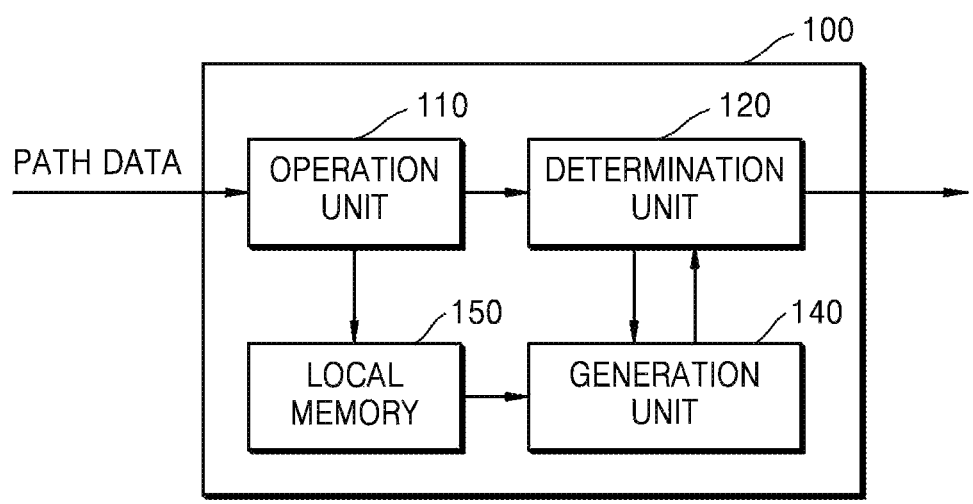
FIG. 25 is a block diagram illustrating a structure of a rendering apparatus according to another embodiment.

FIG. 25 is a block diagram illustrating a structure of the rendering apparatus 100 according to another embodiment.

Referring to FIG. 25, the rendering apparatus 100 further includes a generation unit 140 and the local memory 150 in addition to the operation unit 10A to 11C and the determination unit 120. generation unit 140

An example of the operations of the operation unit 10A to 11C and the determination unit 120 is as described above with reference to FIGS. 1 to 17. Accordingly, a detailed description thereof is omitted in the following description. Also, the further inclusion of the dividing unit 130 in the rendering apparatus 100 of FIG. 25 is the same as that described above with reference to FIGS. 18 to 24B.

As described above with reference to FIGS. 1 to 24B, the winding number of a pixel is calculated by the operation unit 10A to 11C. However, according to the rendering apparatus 100 of FIG. 25, the winding number of a pixel is calculated by the generation unit 140, the calculated winding number is transmitted to the determination unit 120. In detail, when the determination unit 120 requests the generation unit 140 to calculate the winding number of a first pixel, the generation unit 140 reads out information about the first winding number $WN_{init}$ of a first tile including the first pixel and at least one of paths passing through the first tile, that is, information about the position and proceeding direction of the path, from the local memory 150. The generation unit 140 calculates the winding number WN of the first pixel by using the read information. A method used by the generation unit 140 to calculate the winding number WN of the first pixel is the same as the method described above with reference to FIGS. 16A to 16C.

The generation unit 140 transmits the winding number WN of the first pixel to the determination unit 120. The determination unit 120 determines whether to perform shading based on the winding number WN of a pixel transmitted from the generation unit 140 and the first winding number $WN_{init}$ of a tile transmitted from the operation unit 10A to 11C.

Figure 26:
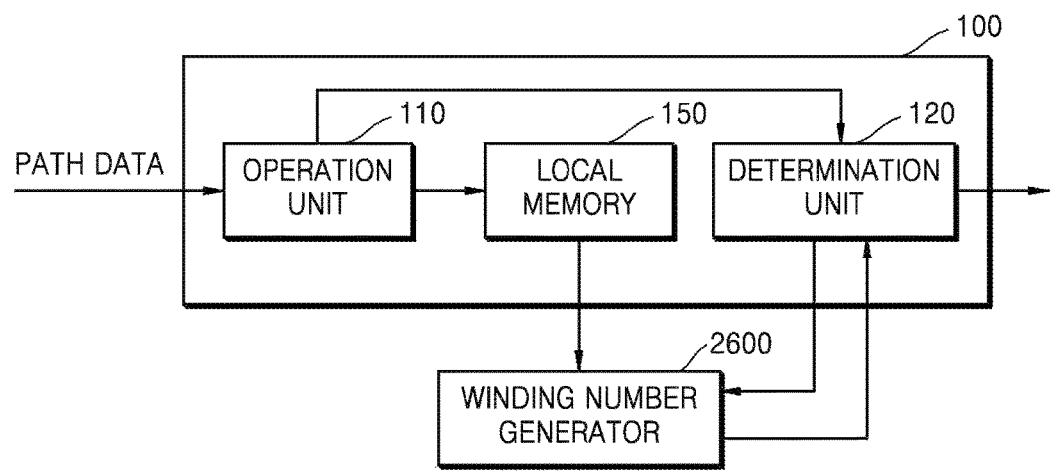
FIG. 26 is a block diagram for explaining an example of a winding number generator according to an embodiment.

FIG. 26 illustrates an example of a winding number generation according to an embodiment apparatus.

Referring to FIG. 26, the rendering apparatus 100 includes the operation unit 10A to 11C, the local memory 150, and the determination unit 120. A winding number generator 2600 is located outside the rendering apparatus 100.

An example of the operations of the operation unit 10A to 11C, the local memory 150, and the determination unit 120 included in the rendering apparatus 100 is the same as that described above with reference to FIGS. 1 to 25. Accordingly, a detailed description thereof is omitted in the following description. Also, the further inclusion of the dividing unit 130 in the rendering apparatus 100 of FIG. 26 is the same as described above with reference to FIGS. 18 to 25.

The winding number generator 2600 is an independent apparatus separate from the rendering apparatus 100. An example of the operation of the winding number generator 2600 is the same as that of the generation unit 140 of FIG. 25.

Figure 27A:
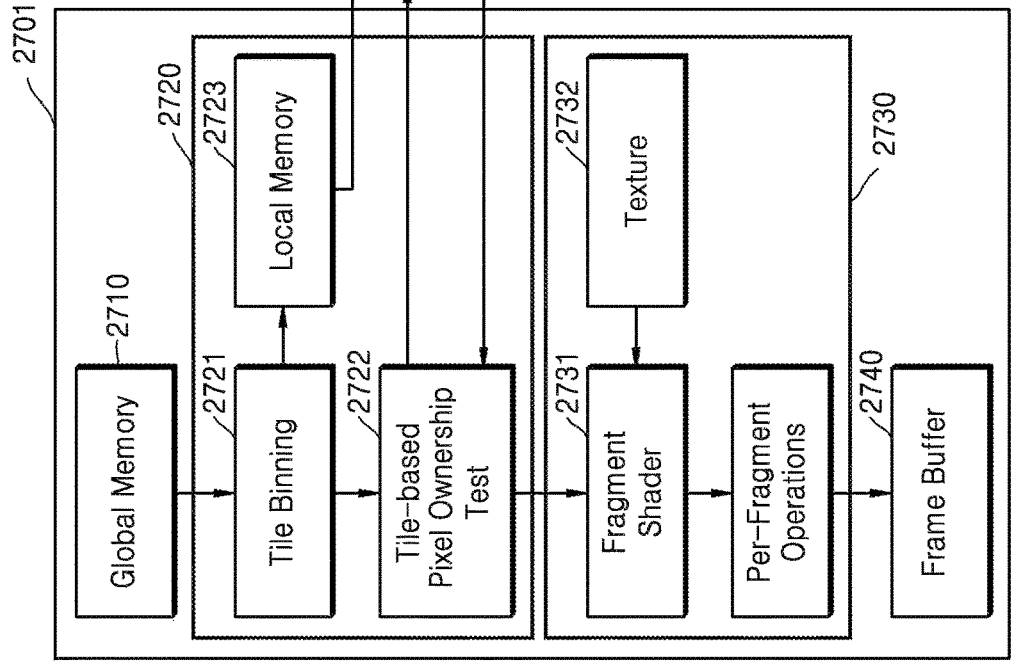
FIGS. 27A and 27B are views for explaining an example in which a path rendering method is embodied in a graphics processing unit (GPU)
Figure 27B:
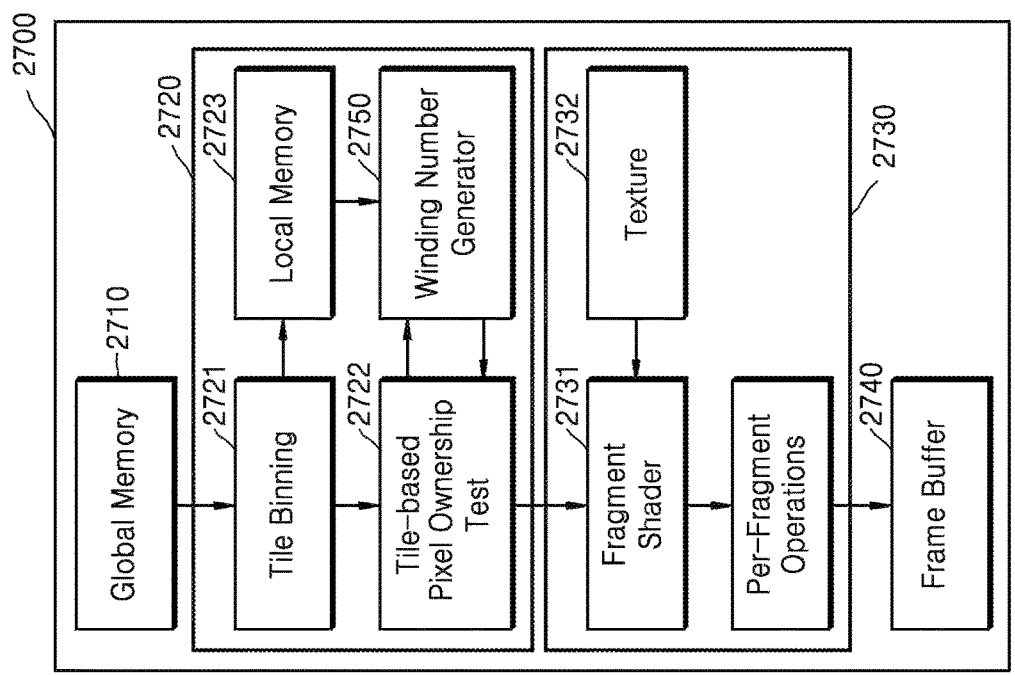

FIGS. 27A and 27B illustrate examples in which a path rendering method is embodied in a GPU 2700 according to an embodiment.

Referring to FIG. 27A, a path rendering method executed in the GPU 2700 includes operations that are time serially processed in the rendering apparatus 100 of FIGS. 1, 18, and 25. Accordingly, it may be seen that the descriptions on the rendering apparatus 100 illustrated in FIGS. 1, 18, and 25, though they are omitted in the following description, is applied to the following description described with reference to FIG. 27A.

Referring to FIG. 27A, the GPU 2700 includes a global memory 2710, a vertex shader 2720, a pixel shader 2730, and a frame buffer 2740. The vertex shader 2720 performs the same function as that of the rendering apparatus 100 illustrated in FIGS. 1, 18, and 25.

Referring to FIG. 27B, a winding number generator 2750 is illustrated as an independent apparatus separated from a GPU 2701. In other words, the winding number generator 2750 may be included inside the GPU 2700 or may be independently located outside the GPU 2701.

The pixel shader 2730 illustrated in FIGS. 27A and 27B performs shading on each of the pixels included in the frame. First, the pixel shader 2730 or the fragment shader 2731 included in the pixel shader 2730 sets a color value to each of the pixels. The fragment shader 2731 may set a color value to each of the pixels by using a texture 2732 that is previously stored. Thereafter, the pixel shader 2730 performs post-processing work on each of the pixels. The post-processing work includes a blending work or an antialiasing work. Then, the pixel shader 2730 transmits a result of the pixel processing to the frame buffer 2740, and the frame buffer 2740 stores information transmitted from the pixel shader 2730.

An example of the operation of the vertex shader 2720 is described with reference to FIGS. 28 to 31.

Figure 28:
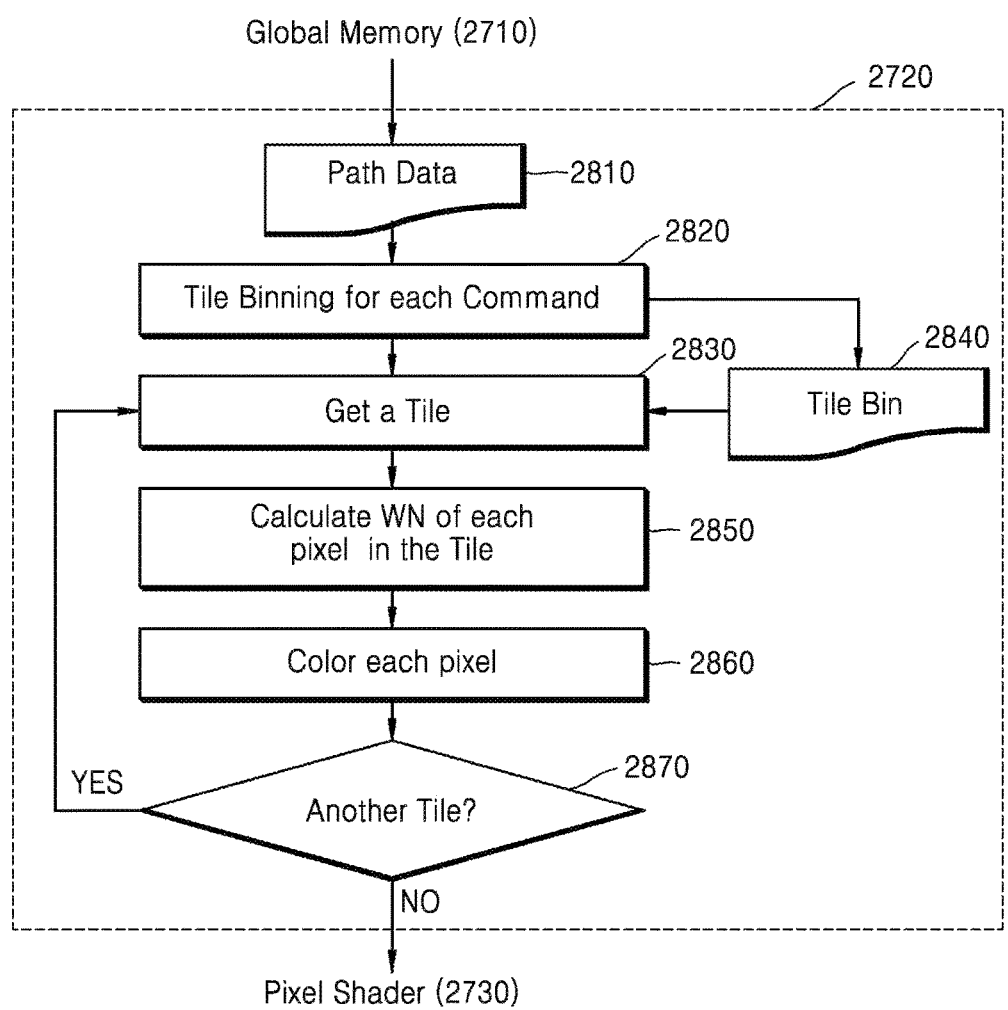
FIG. 28 is a flowchart for explaining an example of an operation of a vertex shader according to an embodiment.

FIG. 28 illustrates an example in which the vertex shader 2720 operates according to an embodiment.

The vertex shader 2720 receives path data 2810 from the global memory 2710. The vertex shader 2720 performs tile binning with respect to each command included in the path data 2810 (2820). Tile binning signifies a process of setting the first winding number to each of the tiles included in the frame. In other words, as described above with reference to FIGS. 6A to 13B, the vertex shader 2720 selects a tile through which the path passes from among the tiles included in the frame and sets the first winding number with respect to each of the tiles included in the frame. While the vertex shader 2720 performs tile binning, a tile bin 2840 indicating generated information, for example, the first winding number and the position and direction of the path that passes through the tile, is stored in a local memory 2723.

An example in which the vertex shader 2720 performs tile binning is described with reference to FIG. 29.

Figure 29:
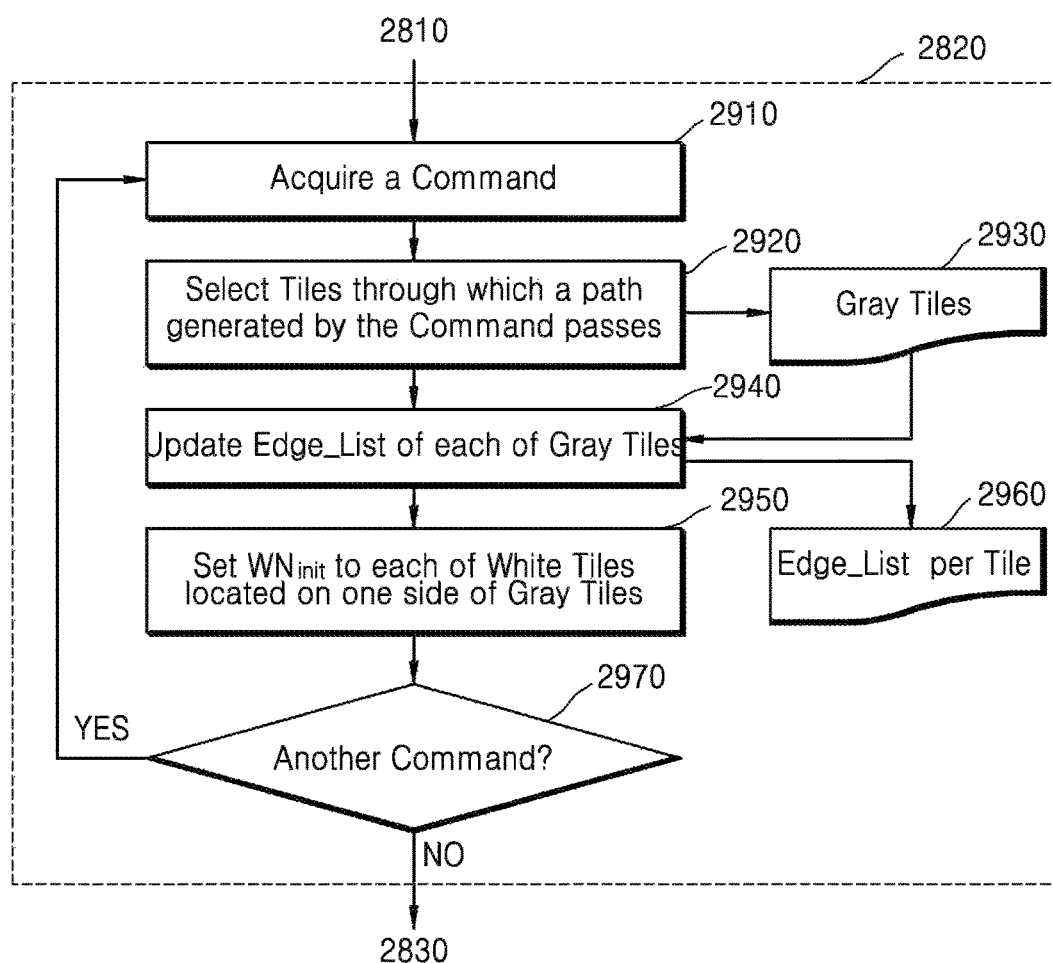
FIG. 29 is a flowchart for explaining an example in which the vertex shader performs tile binning according to an embodiment.

FIG. 29 illustrates an example in which the vertex shader 2720 performs tile binning according to an embodiment.

The vertex shader 2720 acquires a command from the path data 2810 (2910). The vertex shader 2720 searches for tiles to be passed by the command, among the tiles included in the frame (2920). In other words, the vertex shader 2720 selects tiles (hereinafter, referred to as the grey tiles (2930), through which the path passes, among the tiles included in the frame. The vertex shader 2720 updates the information "Edge_List" of each of the grey tiles 2930 (2940). The information "Edge_List" of each of the grey tiles 2930 may be stored in the local memory 2723 (2960).

The vertex shader 2720 sets the first winding number $WN_{init}$ to each of the tiles (hereinafter, referred to as the white tiles) located at one side of the grey tiles 2930 from among the tiles included in the frame (2950).

Then, the vertex shader 2720 determines whether a command that is not used for tile binning exists in the path data (2970). If a command that is not used for tile binning exists, Operation 2910 is performed. Otherwise, Operation 2830 of FIG. 28 is performed.

Referring back to FIG. 28, the vertex shader 2720 acquires any one of the tiles included in the frame (2830), and calculates the winding number of each of the pixels included in the acquired tile (2850). The vertex shader 2720 may calculate the winding number of a pixel by using a tile bin 2840 stored in the local memory 2723.

Then, the vertex shader 2720 determines whether to perform shading of a pixel based on a result of the calculation of the winding number. For example, the vertex shader 2720 may determine whether to perform coloring of a pixel based on the result of the calculation of the winding number (2860).

Operations 2830 to 2860 illustrated in FIG. 28 are described in detail with reference to FIG. 30.

Figure 30:
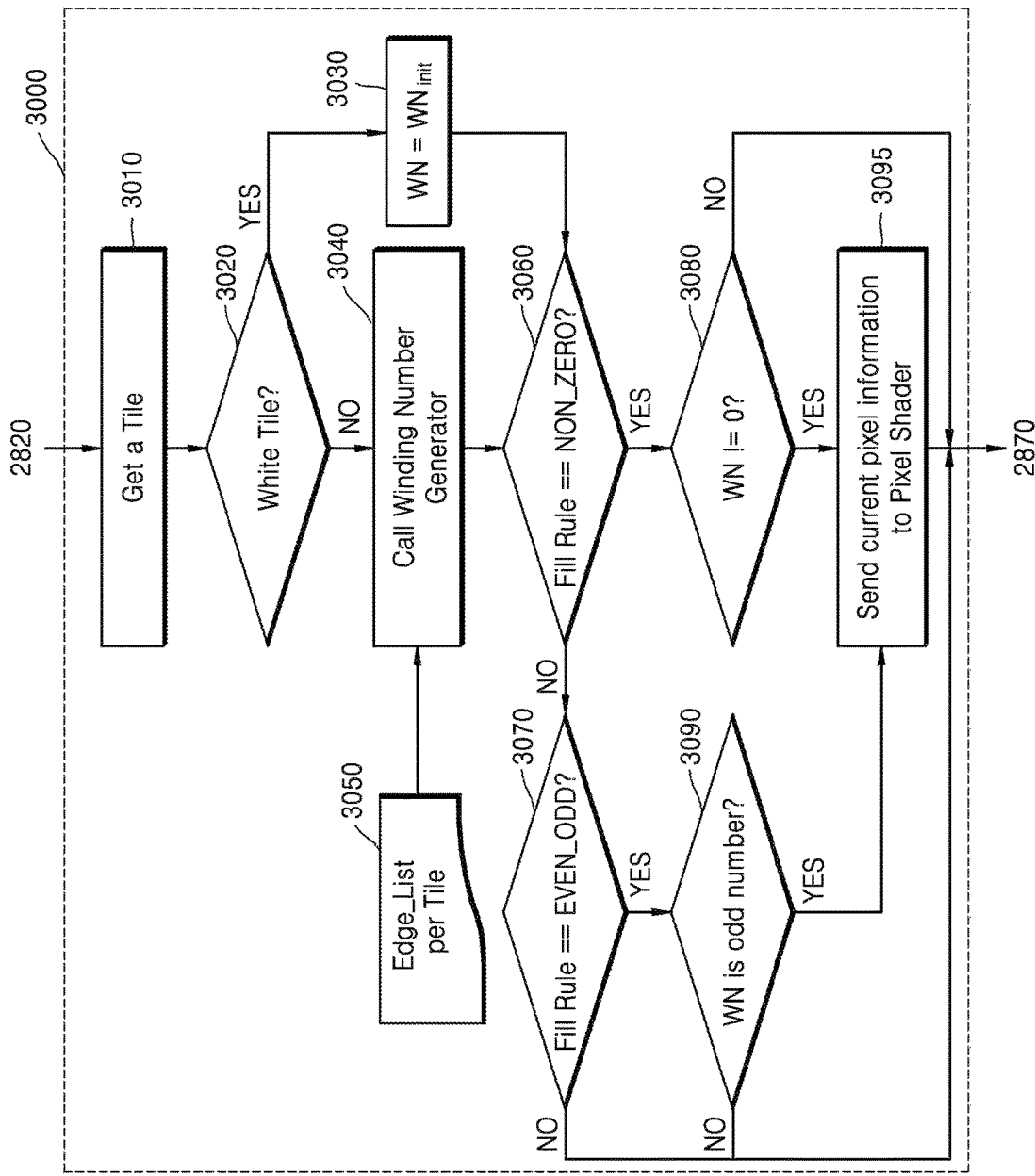
FIG. 30 is a flowchart for explaining an example in which the vertex shader calculates a winding number of each of pixels and determines whether to perform shaking of a pixel, according to an embodiment.

FIG. 30 illustrates an example in which the vertex shader 2720 calculates the winding numbers of the pixels and determines whether to perform shading of the pixels according to an embodiment.

The vertex shader 2720 acquires any one of the tiles included in the frame (3010), and determines whether the acquired tile is a white tile (3020). If the acquired tile is a white tile, Operation 3030 is performed. Otherwise, Operation 3040 is performed.

If the acquired tile is a white tile, the vertex shader 2720 determines the set first winding number $WN_{init}$ as the winding number WN of each of the pixels included in the white tile (3030).

If the acquired tile is a gray tile, the vertex shader 2720 calculates the winding number of each of the pixels included in the gray tile. The vertex shader 2720 may request the winding number generator 2750 to calculate the winding numbers of the pixels. The winding number generator 2750 may calculate the winding number of each of the pixels included in the gray tile by using the information "Edge_List" stored in the local memory 2723. An example in which the winding number generator 2750 calculate the winding numbers of the pixels is the same as the example described above with reference to FIGS. 16A to 16D.

The vertex shader 2720 determines whether to perform shading with respect to each of the pixels based on a first rule (3060). The first rule signifies a rule (non-zero rule) of assigning a color value to each of the pixels having a winding number value that is not 0. When the vertex shader 2720 determines whether to set a color to a pixel based on the first rule, Operation 3080 is performed. Otherwise, Operation 3070 is performed.

The vertex shader 2720 determines whether the winding number of each of the pixels is not 0 (3080). For the pixel having the winding number that is not 0, the vertex shader 2720 gives a command to the pixel shader 2730 to perform shading on the pixel (3095).

The vertex shader 2720 determines whether to perform shading of each of the pixels based on a second rule (3070). The second rule signifies a rule (even-odd rule) of assigning a color value to each of the pixels having a winding number value that is an odd number. When the vertex shader 2720 determines whether a color is set to a pixel based on the second rule, Operation 3090 is performed. Otherwise, the process is terminated.

As described above with reference to Operations 3060 and 3070, the vertex shader 2720 may assign a color value to each of the pixels based on the first rule and the second rule, but the present embodiment is not limited thereto. For example, the vertex shader 2720 may assign a color value to each of the pixels based on an inverse non-zero rule of the first rule or an inverse even-odd rule of the second rule.

The vertex shader 2720 determines whether the winding number of each of the pixels is an odd number or an even number (3090). The odd number signifies that the absolute value of the winding number of a pixel is an odd number. For example, when the winding number is +3, the winding number is determined to be an odd number. When the winding number is −3, the winding number is also determined to be an odd number. For a pixel having a winding number that is an odd number, the vertex shader 2720 instructs the pixel shader 2730 to perform shading of a pixel (3095).

Referring back to FIG. 28, before instructing the pixel shader 2730 to perform shading of a pixel, the vertex shader 2720 determines whether a tile having pixels whose winding numbers are not calculated exists in the tiles included in the frame (2870). If a tile having pixels whose winding numbers are not calculated exists, Operation 2830 is performed. Otherwise, the vertex shader 2720 instructs the pixel shader 2730 to perform shading of a pixel.

Figure 31:
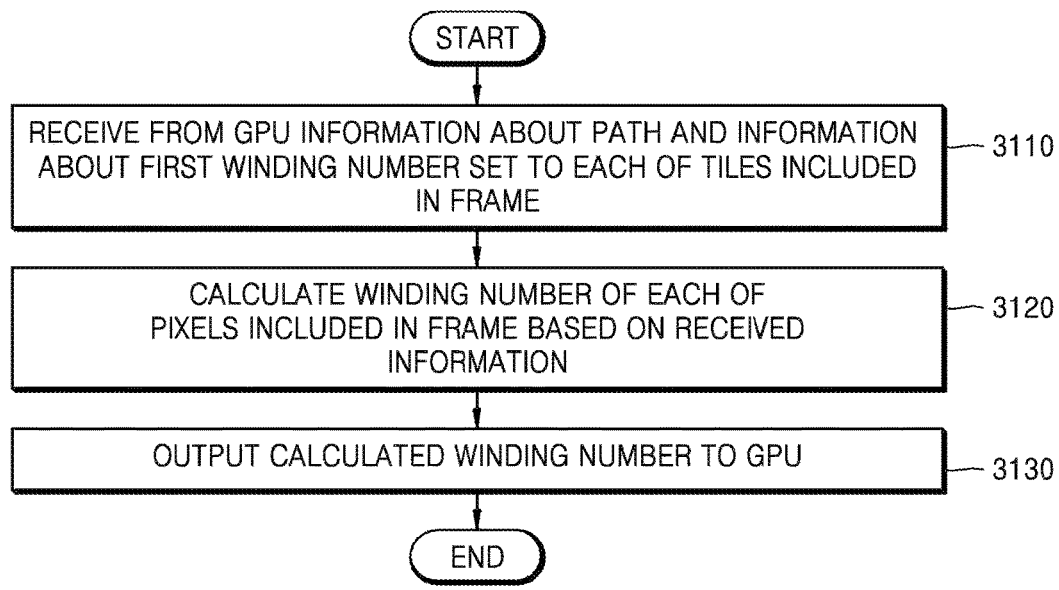
FIG. 31 is a flowchart for explaining an example of a method of calculating a winding number of a pixel according to an embodiment.

FIG. 31 is a flowchart for explaining an example of a method of calculating the winding number of a pixel according to an embodiment.

Referring to FIG. 31, the method of calculating the winding number of a pixel include operations that are time serially processed in the winding number generators 2600 and 2750 illustrated in FIGS. 26 and 27B. Accordingly, it may be seen that the descriptions on the winding number generators 2600 and 2750 illustrated in FIGS. 26 and 27B, though they are omitted in the following description, is applied to the method of calculating the winding number of a pixel described with reference to FIG. 31.

In Operation 310A to 11C, the winding number generators 2600 and 2750 receive information, from the GPUs 2700 and 2701, about at least one of paths and information about the first winding number set to each of the tiles included in the frame.

In Operation 3120, the winding number generators 2600 and 2750 calculate the winding number corresponding to each of the pixels included in the frame by using the received information.

In Operation 3130, the winding number generators 2600 and 2750 output the calculated winding number to the GPUs 2700 and 2701.

On the other hand, the above-described method may also be implemented through computer readable code/instructions in/on a medium, e.g., a computer readable medium, to control at least one processing element to implement any above described embodiment. The medium can correspond to any medium/media permitting the storage and/or transmission of the computer readable code. The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs).

According to the above descriptions with reference to FIGS. 1 to 31, the rendering apparatus assigns the same winding number to all pixels included in each of the tiles, through which a path does not pass, and calculates the winding number only for each of the pixels included in the tiles, through which a path passes, from among the pixels included in the frame. Thus, the performance of the rendering apparatus may be improved.

Also, path rendering may be performed without using a stencil buffer. Thus, the problems of excessive generation of memory input/output due to a use of the stencil buffer and generation of redundant memory input/output may be solved.

Also, since winding numbers with respect to each of the pixels included in the frame are generated in parallel, path rendering may be performed at high speed and high resolution rendering may be achieved over a short period of time.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments of the present inventive concept have been described with reference to the figures, it will be understood by those of ordinary skill in the art that various changes in form and details may be made therein without departing from the spirit and scope of the present inventive concept as defined by the following claims.

What is claimed is:

1. A method of rendering an object including a path, the method comprising:
   obtaining, at a processor, path data including information about vertices included in the path and a command corresponding to the path;
   calculating, at the processor, a final winding number of each of tiles included in a frame based on the path data;
   determining, at the processor, for each tile, whether to perform shading based on the final winding number of the tile; and
   performing shading on each of pixels included in the frame based on a result of the determining,
   wherein the calculating includes,
      setting a first winding number of each of the tiles included in the frame based on the path data; and
      calculating a second winding number of each of the tiles, through which the path passes, from among the tiles included in the frame based on the first winding number.

2. The method of claim 1, wherein the final winding number of each of the tiles, through which the path does not pass, from among the tiles included in the frame corresponds to the first winding number, and the final winding number of each of the tiles, through which the path passes, from among the tiles included in the frame corresponds to the second winding number.

3. The method of claim 1, wherein the setting of the first winding number comprises:
   assigning an initial winding number to each of the tiles included in the frame;
   selecting tiles, through which the path passes, from among the tiles included in the frame; and
   updating the initial winding number of each of the tiles located at one side of the selected tiles according to a shape of the path passing through the selected tiles.

4. The method of claim 3, wherein the one side is determined according to a position of each of the tiles and a position of the path in the frame.

5. The method of claim 3, wherein the selecting of the tiles comprises:
   determining at least one point on the path meeting the one side of the tiles included in the frame;
   dividing the path based on the determined at least one point; and
   selecting tiles including a rectangle having the divided path as a diagonal line, from among the tiles included in the frame.

6. The method of claim 3, wherein, in the updating of the initial winding number, a predetermined value is added to the initial winding number when the path passes clockwise through two boundaries, facing each other, of at least one of the selected tiles and the predetermined value is subtracted from the initial winding number when the path passes counterclockwise through the two boundaries, facing each other, of the at least one of the selected tiles.

7. The method of claim 3, wherein, in the updating of the initial winding number, a predetermined value is subtracted from the initial winding number when the path passes clockwise through two boundaries, facing each other, of at least one of the selected tiles and the predetermined value is added to the initial winding number when the path passes counterclockwise through the two boundaries, facing each other, of the at least one of the selected tiles.

8. The method of claim 1, wherein the second winding number is calculated for each of pixels included in each tile through which the path passes according to a proceeding direction of the path.

9. The method of claim 3, wherein the one side is determined according to a position of each of pixels included in each tile through which the path passes and a position of the path.

10. The method of claim 8, wherein the calculating of the second winding number comprises:
checking whether the path is located at one side of each of the pixels included in the tile through which the path passes; and
calculating the final winding number by adding a predetermined value to the first winding number when the proceeding direction of the path is clockwise and subtracting the predetermined value from the first winding number when the proceeding direction of the path is counterclockwise.

11. The method of claim 8, wherein the calculating of the second winding number comprises:
checking whether the path is located at a third side of each of pixels included in a tile through which the path passes; and
calculating the final winding number by subtracting a predetermined value from the first winding number when the proceeding direction of the path is clockwise and adding the predetermined value to the first winding number when the proceeding direction of the path is counterclockwise.

12. The method of claim 1, wherein whether to perform shading is determined based on a preset rule.

13. The method of claim 1, wherein, when the path data includes information corresponding to a non-monotonic curve, the method further comprises dividing the non-monotonic curve into a plurality of monotonic curves,
wherein the final winding number is calculated based on a position and a proceeding direction of each of the monotonic curves.

14. The method of claim 13, wherein the non-monotonic curve is divided into a plurality of monotonic curves based on a de Casteljau's algorithm.

15. A method of calculating a winding number of a pixel, the method comprising:
receiving, from a graphics processing unit, information about,
at least one path, and
a first winding number set to each of tiles included in a frame;
calculating a final winding number corresponding to each of the pixels included in the frame based on the received information; and
outputting the calculated final winding number to the graphics processing unit,
wherein the calculating includes:
calculating a second winding number of each of the tiles, through which the at least one path passes, from among the tiles included in the frame based on the first winding number.

16. A non-transitory computer readable storage medium having stored thereon a program, which when executed by a computer, performs the method of claim 1.

17. An apparatus for rendering an object including a path, the apparatus comprising:
memory storing computer-executable instructions; and
one or more processors configured to execute the computer-executable instructions such that the one or more processors are configured to,
obtain path data including information about vertices included in the path and a command corresponding to the path,
determine whether to perform shading based on a final winding number of each of tiles included in a frame,
determine a first winding number of each of the tiles included in the frame based on the path data, and
calculate a second winding number of each of the tiles, through which the path passes, from among the tiles included in the frame based on the first winding number.

18. The apparatus of claim 17, wherein the final winding number of each of the tiles, through which the path does not pass, from among the tiles included in the frame, corresponds to the first winding number, and the final winding number of each of the tiles, through which the path passes, from among the tiles included in the frame, corresponds to the second winding number.

19. The apparatus of claim 17, wherein the one or more processors are further configured to execute the computer-executable instructions such that the one or more processors are configured to:
assign an initial winding number to each of the tiles included in the frame;
select tiles, through which the path passes, from among the tiles included in the frame; and
update the initial winding number of each of the tiles located at one side of the selected tiles according to a shape in which the path passes through the selected tiles.

20. The apparatus of claim 19, wherein the one side is determined according to a position of each of the tiles and a position of the path in the frame.

21. The apparatus of claim 19, wherein the one or more processors are further configured to execute the computer-executable instructions such that the one or more processors are configured to:
determine at least one point on the path meeting the one side of the tiles included in the frame;
divide the path based on the determined at least one point; and
select tiles including a rectangle having the divided path as a diagonal line, from among the tiles included in the frame.

22. The apparatus of claim 19, wherein the one or more processors are further configured to execute the computer-executable instructions such that the one or more processors are configured to add a predetermined value to the initial winding number when the path passes clockwise through two boundaries, facing each other, of at least one of the selected tiles, and subtract the predetermined value from the initial winding number when the path passes counterclockwise through the two boundaries, facing each other, of the at least one of the selected tiles.

23. The apparatus of claim 19, wherein the one or more processors are further configured to execute the computer-executable instructions such that the one or more processors are configured to subtract a predetermined value from the initial winding number when the path passes clockwise through two boundaries, facing each other, of at least one of the selected tiles, and add the predetermined value to the initial winding number when the path passes counterclockwise through the two boundaries, facing each other, of the at least one of the selected tiles.

24. The apparatus of claim 17, wherein the one or more processors are further configured to execute the computer-executable instructions such that the one or more processors are configured to calculate the second winding number for each of pixels included in each tile, through which the path passes, according to a proceeding direction of the path.

25. The apparatus of claim 19, wherein the one side is determined according to a position of each of pixels included in each tile, through which the path passes, and a position of the path.

26. The apparatus of claim 24, wherein the one or more processors are further configured to execute the computer-executable instructions such that the one or more processors are configured to:
  check whether the path is located at one side of each of the pixels, included in each tile, through which the path passes; and
  calculate the final winding number by adding a predetermined value to the first winding number when the proceeding direction of the path is clockwise and subtracting the predetermined value from the first winding number when the proceeding direction of the path is counterclockwise.

27. The apparatus of claim 24, wherein the one or more processors are further configured to execute the computer-executable instructions such that the one or more processors are configured to:
  check whether the path is located at one side of each of the pixels, included in each tile, through which the path passes; and
  calculate the final winding number by subtracting a predetermined value from the first winding number when the proceeding direction of the path is clockwise and adding the predetermined value to the first winding number when the proceeding direction of the path is counterclockwise.

28. The apparatus of claim 17, wherein the one or more processors are further configured to execute the computer-executable instructions such that the one or more processors are configured to determine whether to perform shading based on a preset rule.

29. The apparatus of claim 17 wherein the one or more processors are further configured to execute the computer-executable instructions such that the one or more processors are configured to
  divide a non-monotonic curve into a plurality of monotonic curves when the path data includes information corresponding to a non-monotonic curve, and
  calculate the final winding number based on a position and a proceeding direction of each of the monotonic curves.

30. The apparatus of claim 29, wherein the one or more processors are further configured to execute the computer-executable instructions such that the one or more processors are configured to divide the non-monotonic curve into a plurality of monotonic curves based on a de Casteljau's algorithm.

31. An apparatus for generating a winding number of each of pixels included in a frame, the apparatus being connected to a graphics processing unit configured to render at least one path forming an object and being configured to:
  receive, from the graphics processing unit, information about,
    the at least one path, and
    a first winding number set to each of tiles included in the frame;
  calculate a final winding number corresponding to each of the pixels included in the frame based on the received information; and
  output the calculated final winding number to the graphics processing unit,
  wherein the apparatus being further configured to:
    calculate a second winding number of each of the tiles, through which the at least one path passes, from among the tiles included in the frame based on the first winding number.

32. A method of rendering an object, the method comprising:
  dividing, by a processor, an image comprising a path into a plurality of tiles, each of the tiles comprising a plurality of pixels;
  determining, by the processor, whether the object comprising at least one path deviated to one side of a frame based on path data;
  assigning, by the processor, via different methods, a winding number to pixels included in tiles where no path exists and pixels included in tiles where a path exist, from among the plurality of tiles, in response to determining that the object deviated to one side of the frame;
  determining whether to perform shading based on the assigned winding number; and
  performing shading on each of pixels included in the frame based on a result of the determining whether to perform shading.

33. The method of claim 32, wherein the same winding number is assigned to all pixels included in each of the tiles where no path exists.

34. The method of claim 32, wherein the winding number is assigned to pixels included in each of the tiles where the path exists according to a position of each pixel and a position and proceeding direction of a path existing in each tile.

35. The method of claim 32, further comprising dividing a non-monotonic curve into a plurality of monotonic curves when the path is a non-monotonic curve,
  wherein a winding number is assigned via different methods to pixels included in the tiles where no monotonic curve exists and to pixels included in the tiles where the monotonic curves exist.

\* \* \* \* \*